(12) United States Patent
Kim et al.

(10) Patent No.: US 12,302,266 B2
(45) Date of Patent: May 13, 2025

(54) RECEIVING SIGNAL IN A WIRELESS COMMUNICATION SYSTEM

(71) Applicant: Samsung Electronics Co., Ltd., Suwon-si (KR)

(72) Inventors: Taehyoung Kim, Suwon-si (KR); Jinkyu Kang, Suwon-si (KR); Youngbum Kim, Suwon-si (KR); Younsun Kim, Suwon-si (KR); Hyoungju Ji, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 17/642,536

(22) PCT Filed: Sep. 28, 2020

(86) PCT No.: PCT/KR2020/013178
§ 371 (c)(1),
(2) Date: Mar. 11, 2022

(87) PCT Pub. No.: WO2021/066441
PCT Pub. Date: Apr. 8, 2021

(65) Prior Publication Data
US 2022/0330182 A1  Oct. 13, 2022

(30) Foreign Application Priority Data

Oct. 4, 2019 (KR) .................. 10-2019-0123312

(51) Int. Cl.
*H04W 56/00* (2009.01)
*H04L 5/14* (2006.01)
(Continued)

(52) U.S. Cl.
CPC ............ *H04W 56/001* (2013.01); *H04L 5/14* (2013.01); *H04W 72/1268* (2013.01);
(Continued)

(58) Field of Classification Search
CPC ........... H04W 56/001; H04W 72/1268; H04W 72/23; H04W 74/008; H04W 74/0833;
(Continued)

(56) References Cited

U.S. PATENT DOCUMENTS 10,039,098 B2  7/2018  Chincholi et al.
2012/0063373 A1  3/2012  Chincholi et al.
(Continued)

FOREIGN PATENT DOCUMENTS

CN  105981463 A  9/2016
CN  106712921 A  5/2017
(Continued)

OTHER PUBLICATIONS

3GPP TS 38.213 V15.7.0, 3rd Generation Partnership Project, Technical Specification Group Radio Access Network, NR, Physical layer procedures for control, (Release 15), Sep. 28, 2019.
(Continued)

*Primary Examiner* — John D Blanton
(74) *Attorney, Agent, or Firm* — Jefferson IP Law, LLP

(57) ABSTRACT

The disclosure relates to a method and apparatus for transmitting and receiving a signal in a wireless communication system. An operating method of a terminal in a wireless communication system includes receiving, from a base station, information related to a position of a symbol in which a synchronization signal block is transmitted in a time domain, determining whether a position of a symbol configured to transmit an uplink signal overlaps the position of the symbol in which the synchronization signal block is transmitted in the time domain, in case that the position of
(Continued)

the symbol configured to transmit the uplink signal overlaps the position of the symbol in which the synchronization signal block is transmitted in the time domain, determining whether a time or frequency-division duplexing (XDD)-related indicator is configured or received, and transmitting the uplink signal to the base station, based on a result of the determining whether the XDD-related indicator is configured or received.

12 Claims, 24 Drawing Sheets

(51) Int. Cl.
*H04W 72/1268* (2023.01)
*H04W 72/23* (2023.01)
*H04W 74/00* (2009.01)
*H04W 74/0833* (2024.01)

(52) U.S. Cl.
CPC ......... *H04W 72/23* (2023.01); *H04W 74/002* (2013.01); *H04W 74/0833* (2013.01)

(58) Field of Classification Search
CPC ........... H04W 72/535; H04W 72/0446; H04W 72/0453; H04W 72/53; H04W 48/10; H04L 5/14; H04L 27/26025; H04L 27/26136; H04L 5/0048; H04L 5/0023; H04L 5/0035; H04L 5/0028; H04L 5/0044; H04L 5/0053; H04L 5/0092; H04L 5/0094; H04L 5/1469; H04J 13/16
See application file for complete search history.

(56) References Cited

U.S. PATENT DOCUMENTS

| | | |
|---|---|---|
| 2012/0155436 A1 | 6/2012 | Lindoff |
| 2016/0057746 A1 | 2/2016 | Drucker |
| 2016/0080133 A1 | 3/2016 | Golitschek Edler Von Elbwart et al. |
| 2016/0330011 A1* | 11/2016 | Lee .......................... H04L 5/14 |
| 2016/0345315 A1 | 11/2016 | Noh et al. |
| 2017/0034808 A1 | 2/2017 | Ouchi et al. |
| 2017/0347343 A1 | 11/2017 | Seo et al. |
| 2018/0035451 A1 | 2/2018 | Krishnamoorthi et al. |
| 2018/0091285 A1 | 3/2018 | Hosseini et al. |
| 2018/0132231 A1 | 5/2018 | Drucker |
| 2019/0208550 A1 | 7/2019 | Ko et al. |
| 2020/0044796 A1* | 2/2020 | Yang ..................... H04W 56/00 |
| 2020/0205173 A1* | 6/2020 | Frederiksen .......... H04L 1/1854 |
| 2020/0351025 A1 | 11/2020 | Choi et al. |
| 2021/0112503 A1* | 4/2021 | Zhang ................... H04W 24/08 |
| 2022/0159596 A1* | 5/2022 | Kim ........................ H04J 11/00 |
| 2023/0353336 A1 | 11/2023 | Lee et al. |

FOREIGN PATENT DOCUMENTS

| | | |
|---|---|---|
| KR | 10-2016-0099095 A | 8/2016 |
| KR | 10-2020-0127681 A | 11/2020 |

OTHER PUBLICATIONS

Intel Corporation, Further discussion on collision of RRM measurement with UL transmission, R4-1902893, 3GPP TSG-RAN4 Meeting #90bis, Xi'an, China, Apr. 8-12, 2019.
International Search Report and Written Opinion dated Jan. 8, 2021, issued in International Patent Application No. PCT/KR2020/013178.
Extended European Search Report dated Jul. 12, 2022, issued in European Patent Application No. 20872961.6.
European Office Action Apr. 18, 2024, dated in European Application No. 20872961.6.
Korean Office Action dated Mar. 17, 2025, issued in Korean Application No. 10-2019-0123312.
Chinese Office Action dated Feb. 25, 2025, issued in Chinese Application No. 202080069788.5.

* cited by examiner

FIG. 5
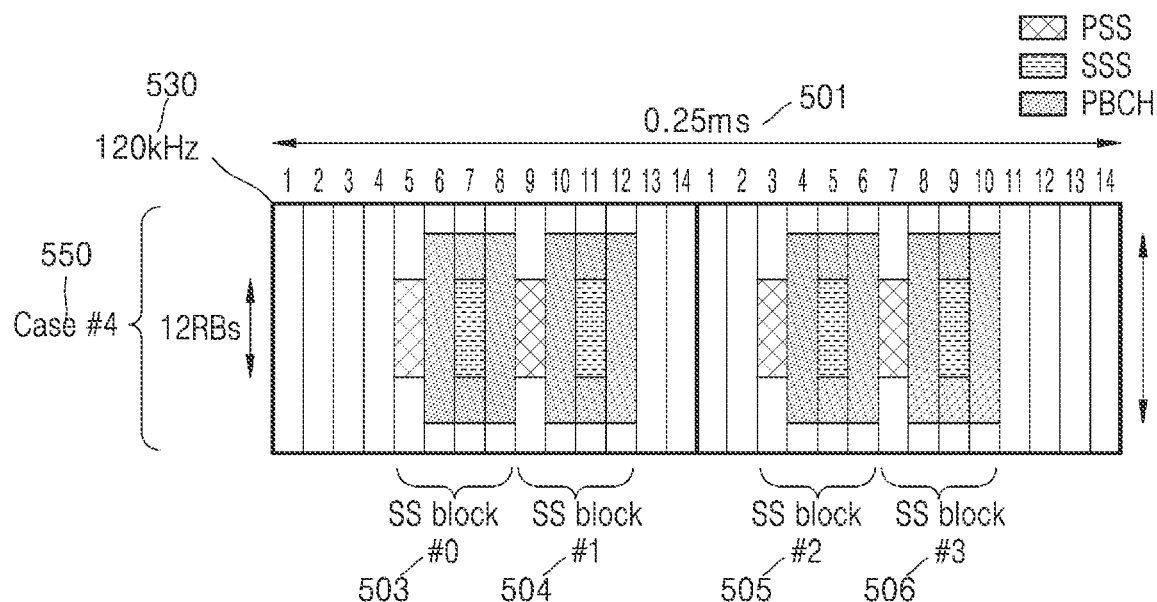
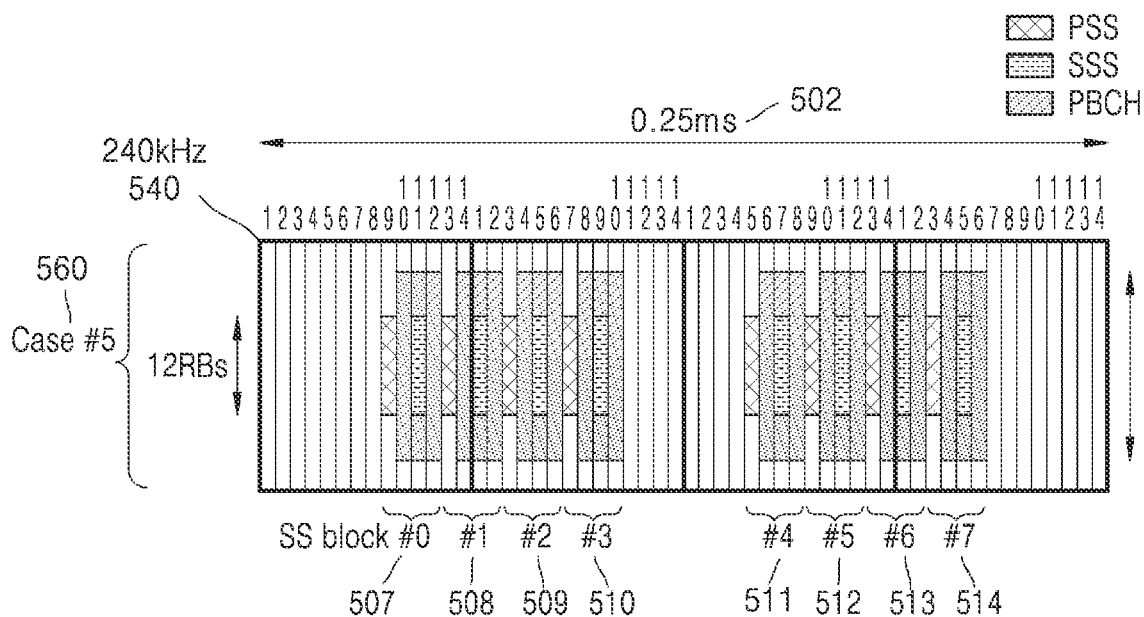

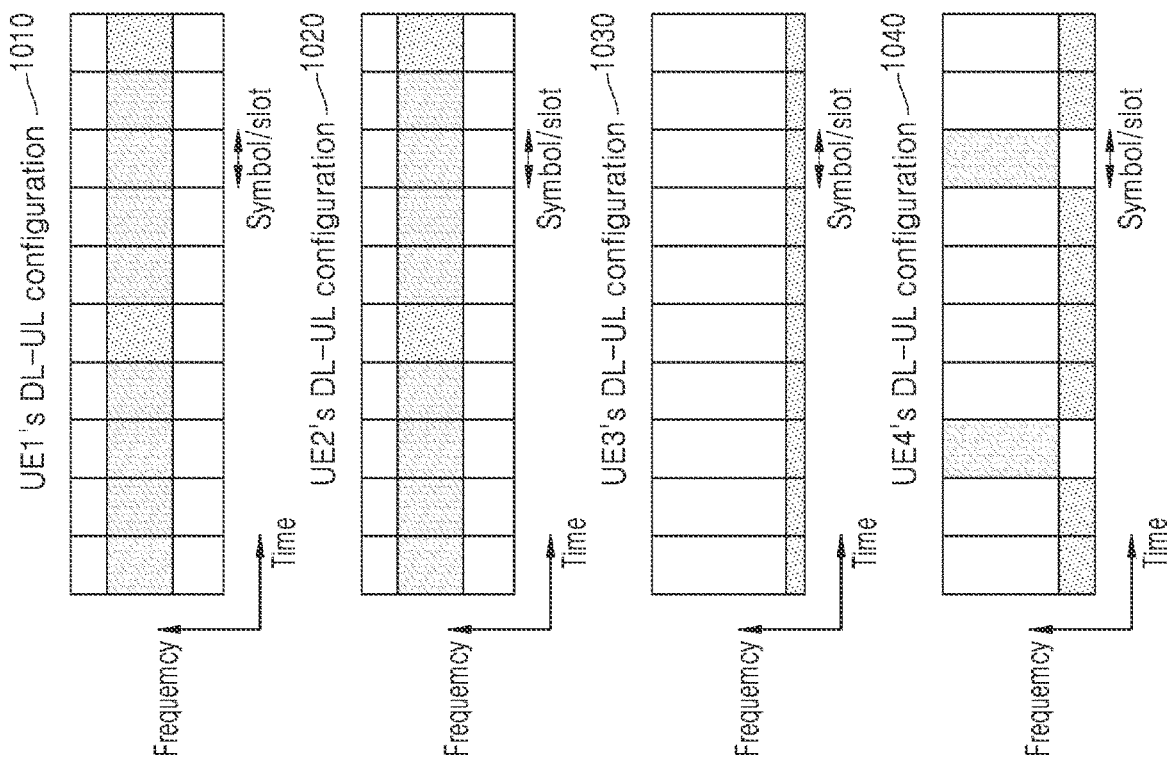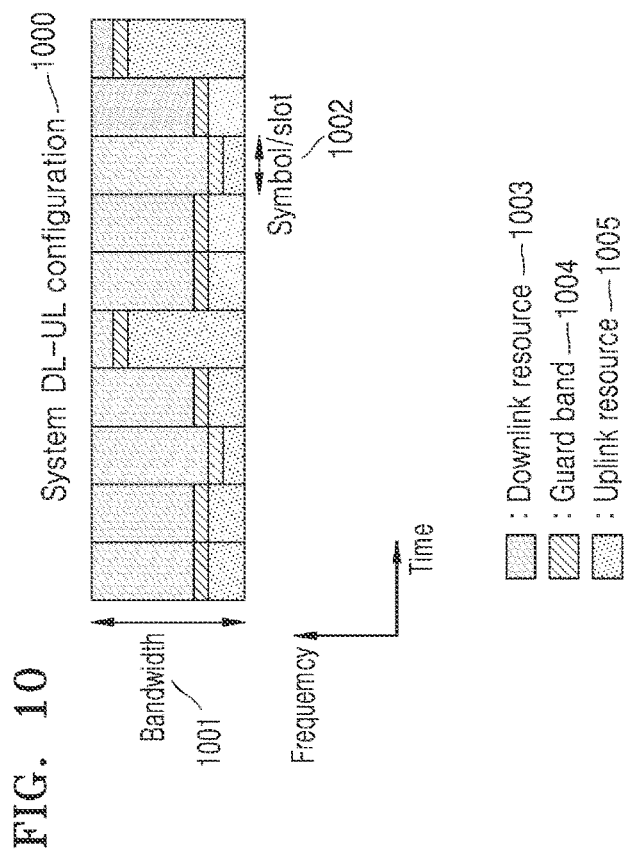
FIG. 10

RECEIVING SIGNAL IN A WIRELESS COMMUNICATION SYSTEM

TECHNICAL FIELD

The disclosure relates to a method and apparatus for transmitting and receiving a signal in a wireless communication system.

BACKGROUND ART

In order to meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called beyond 4G network communication systems or post long-term evolution (post-LTE) systems. In order to achieve a high data rate, consideration is given to implementing 5G communication systems in millimeter wave (mmW) frequency bands (e.g., 60 GHz bands). In order to reduce pathloss of radio waves and increase a transmission distance of radio waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks, for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and reception interference cancellation have been developed. Also, for 5G communication systems, advanced coding modulation (ACM) schemes such as hybrid frequency-shift keying (FSK) and quadrature amplitude modulation (QAM) modulation (FQAM) and sliding window superposition coding (SWSC) and enhanced network access schemes such as filter-bank multi-carrier (FBMC), non-orthogonal multiple access (NOMA), and sparse code multiple access (SCMA) have been developed.

The Internet has evolved from a human-based connection network whereby humans generate and consume information to the Internet-of-things (IoT) whereby distributed elements such as objects exchange information with each other to process the information. Internet-of-Everything (IoE) technology has emerged, in which the IoT technology is combined with, for example, technology for processing big data through connection with a cloud server. In order to implement the IoT, technology elements such as sensing technology, wired/wireless communication and network infrastructures, service interface technology, and security technology are required, and thus, technologies for inter-object connection, such as sensor network, machine to machine (M2M) communication, or machine-type communication (MTC), has recently been studied. In an IoT environment, intelligent Internet technology (IT) services may be provided to collect and analyze data obtained from connected objects to generate new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Accordingly, various attempts have been made to apply 5G communication systems to IoT networks. For example, technology such as a sensor network, M2M communication, or MTC is implemented by 5G communication technology such as beam-forming, MIMO, or array antenna. The application of cloud radio access network (Cloud-RAN) as the above-described big data processing technology may also be an example of convergence of 3eG communication technology and IoT technology.

Because various services may be provided due to the development of wireless communication systems, methods for effectively providing these services are required.

DESCRIPTION OF EMBODIMENTS

Solution to Problem

The disclosure provides efficient channel and signal transmitting and receiving methods and apparatuses for various services in mobile communication systems.

Advantageous Effects of Disclosure

Disclosed embodiments provide efficient channel and signal transmitting and receiving methods and apparatuses in mobile communication systems.

BRIEF DESCRIPTION OF DRAWINGS

FIG. 5 is a diagram illustrating transmission cases of a synchronization signal block in a frequency band of 6 GHz or more considered in a 5G communication system, according to an embodiment of the disclosure.

FIG. 10 is a diagram illustrating an uplink-downlink configuration of a time or frequency (X) division duplexing (DD) system in which uplink and downlink resources are flexibly divided in time and frequency domains, according to an embodiment of the disclosure.

BEST MODE

Figure 1:
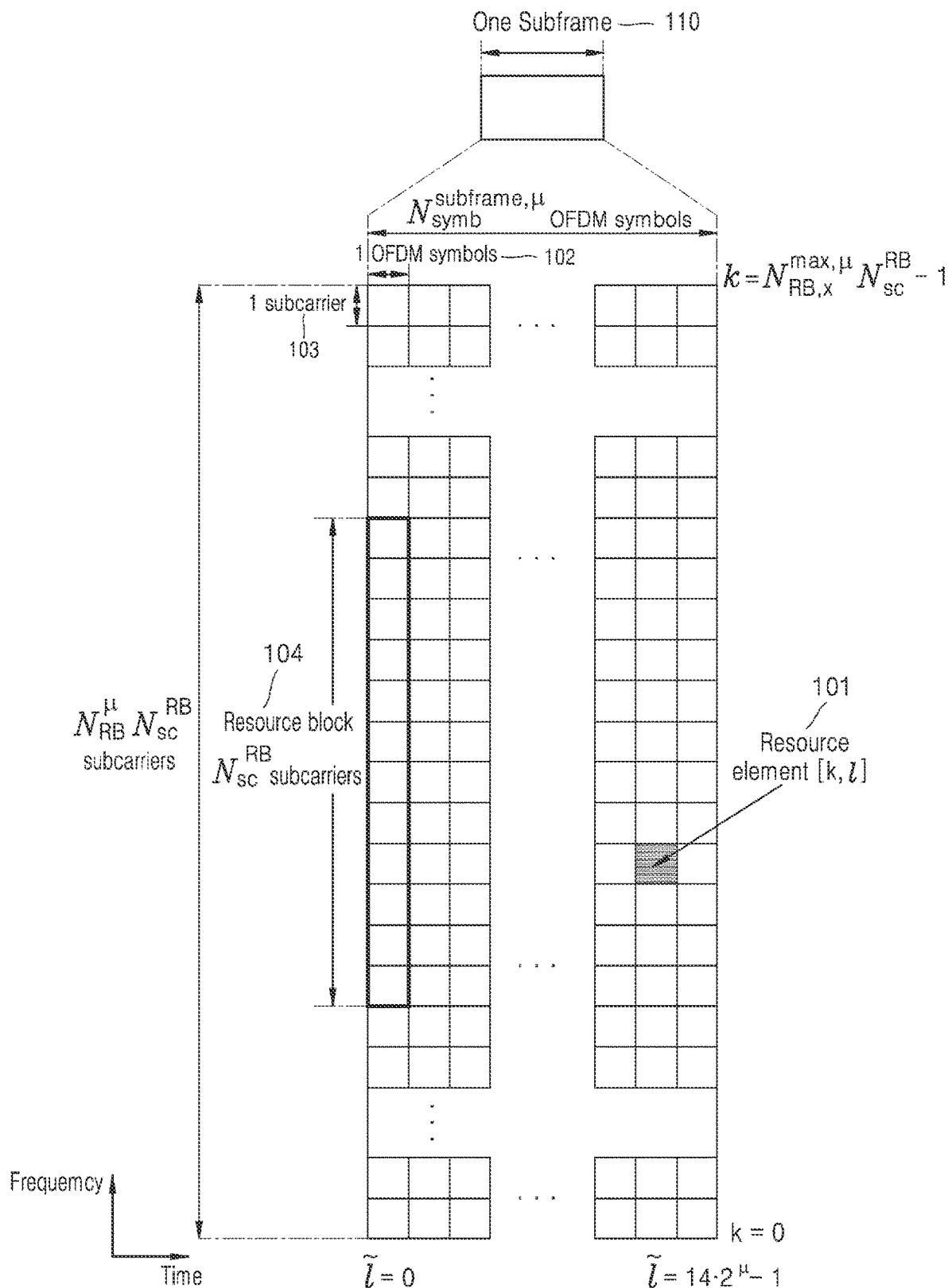
FIG. 1 is a diagram illustrating a basic structure of a time-frequency domain that is a radio resource domain of a 5th generation (5G) system, according to an embodiment of the disclosure.

According to an embodiment of the disclosure, an operating method of a terminal in a wireless communication system includes: receiving, from a base station, a system information block (SIB) or cell-specific configuration information; based on the SIB or the cell-specific configuration information, identifying a position of a synchronization signal block (SSB) transmitted by the base station in a time domain; based on higher layer signaling or downlink control information (DCI), determining whether a transmission symbol of an uplink channel or signal overlaps the position of the SSB transmitted by the base station in the time domain; and based on a result of the determining, transmitting the uplink channel or signal in the transmission symbol.

According to an embodiment of the disclosure, an operating method of a terminal in a wireless communication system includes receiving, from a base station, information related to a position of a symbol in which a synchronization signal block is transmitted in a time domain, transmitting whether a position of a symbol configured to transmit an uplink signal overlaps the position of the symbol in which the synchronization signal block is transmitted in the time domain, in case that the position of the symbol configured to transmit the uplink signal overlaps the position of the symbol in which the synchronization signal block is transmitted in the time domain, determining whether a time or frequency-division duplexing (XDD)-related indicator is configured or received, and based on a result of the determining whether the XDD-related indicator is configured or received, transmitting the uplink signal to the base station.

In case that the position of the symbol configured to transmit the uplink signal does not overlap the position of the symbol in which the synchronization signal block is transmitted in the time domain, the uplink signal may be transmitted to the base station at the position of the symbol configured to transmit the uplink signal.

According to an embodiment of the disclosure, an operating method of a terminal in a wireless communication system includes receiving, from a base station, information related to a position of a symbol in which a random access channel occasion is configured in a time domain, determining whether a position of a symbol configured to receive a downlink signal overlaps the position of the symbol in which the random access channel occasion is configured in the time domain, in case that the position of the symbol configured to receive the downlink signal overlaps the position of the symbol in which the random access channel occasion is configured in the time domain, determining whether a time or frequency division duplexing (XDD)-related indicator is configured or received, and based on a result of the determining whether the XDD-related indicator is configured or received, receiving the downlink signal from the base station.

In case that the position of the symbol configured to receive the downlink signal does not overlap the position of the symbol in which the random access channel occasion is configured in the time domain, the downlink signal may be received from the base station at the position of the symbol configured to receive the downlink signal.

According to an embodiment of the disclosure, an operating method of a terminal in a wireless communication system includes, based on system information or higher layer signaling, identifying a position of a symbol configured as downlink through uplink-downlink configuration information, determining whether a position of a symbol configured to transmit an uplink signal overlaps the position of the symbol configured as the downlink in a time domain, in case that the position of the symbol configured to transmit the uplink signal overlaps the position of the symbol configured as the downlink in the time domain, determining whether a time or frequency division duplexing (XDD)-related indicator is configured or received, and based on a result of the determining whether the XDD-related indicator is configured or received, transmitting the uplink signal to a base station.

In case that the position of the symbol configured to transmit the uplink signal does not overlap the position of the symbol configured as the downlink in the time domain, the uplink signal may be transmitted to the base station at the position of the symbol configured to transmit the uplink signal.

MODE OF DISCLOSURE

Hereinafter, various embodiments of the disclosure will be described in detail with reference to the accompanying drawings.

In the following description of embodiments of the disclosure, descriptions of techniques that are well known in the art and not directly related to the disclosure are omitted. This is to clearly convey the gist of the disclosure by omitting an unnecessary description.

For the same reason, some components of the accompanying drawings may be exaggeratedly shown, omitted, or schematically shown. In addition, the size of each element may not substantially reflect its actual size. In each drawing, the same or corresponding element is denoted by the same reference numeral.

The advantages and features of the disclosure, and methods of achieving the same, will become apparent with reference to embodiments of the disclosure described below in detail in conjunction with the accompanying drawings. However, the disclosure is not limited to the embodiments disclosed below, but may be embodied in different forms, the embodiments are provided to enable a complete disclosure and to fully convey the scope of the disclosure to one of ordinary skill in the art, and the disclosure may be defined by the scope of the claims. In the specification, the same reference numerals denote the same elements. Also, in the following description of the disclosure, well-known functions or constructions are not described in detail in order to avoid unnecessarily obscuring the gist of the disclosure. The terms used herein are those defined in consideration of functions in the disclosure, and may vary according to the intention of users or operators, precedents, etc. Hence, the terms used herein have to be defined based on the meaning of the terms together with the descriptions throughout the specification.

Hereinafter, a base station is an entity that allocates resources to a terminal and may be at least one of a gNode B, an eNode B, a node B, a base station (BS), a radio access unit, a base station controller, or a node on a network. A terminal may include a user equipment (UE), a mobile station (MS), a cellular phone, a smartphone, a computer, or a multimedia system capable of performing a communication function. In the disclosure, a downlink (DL) denotes a wireless transmission path of a signal transmitted by a base station to a terminal, and an uplink (UL) denotes a wireless transmission path of a signal transmitted by a terminal to a base station. Also, while embodiments of the disclosure are described by using a long-term evolution (LTE) or longer term evolution-advanced (LTE-A) system as an example, the embodiments of the disclosure may also be applied to other communication systems having a similar technical background or channel form. For example, $5^{th}$ generation (5G) new radio (NR) mobile communication technology developed after LTE-A may belong thereto, and hereinbelow, 5G may be indicated as a concept including existing LTE, LTE-A, and other similar services. Also, the embodiments of the disclosure may be applied to other communication systems through some modifications without departing from the scope of the disclosure by the judgement of one of ordinary skill in the art.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing equipment, the instructions, which are executed via the processor of the computer or other programmable data processing equipment generate means for implementing the functions specified in the flowchart block(s). Because these computer program instructions may also be stored in a computer-usable or computer-readable memory that may direct the computer or other programmable data processing equipment to function in a particular manner, the instructions stored in the computer-executable or computer-readable memory may produce an article of manufacture including instruction means for performing the functions specified in the flowchart block(s). Because the computer program instructions may also be loaded onto a computer or other programmable data processing equipment, a series of operational steps may be performed on the computer or other programmable data processing equipment to produce a computer implemented process, and thus, the instructions executed on the computer or other programmable data processing equipment may provide steps for implementing the functions specified in the flowchart block(s).

Also, each block may represent a module, segment, or portion of code, which includes one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, according to the functionality involved.

The term "~unit" used in the present embodiment refers to a software or hardware component, such as a field-programmable gate array (FPGA) or an application-specific integrated circuit (ASIC), which performs certain tasks. However, the term "~unit" does not mean to be limited to software or hardware. A "~unit" may be configured to be in an addressable storage medium or may be configured to operate one or more processors. Thus, a "~unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~units" may be combined into fewer components and "~units" or may be further separated into additional components and "~units". Furthermore, components and "~units" may be implemented to operate one or more central processing units (CPUs) in a device or a secure multimedia card. Also, a "~unit" in an embodiment may include one or more processors.

Hereinafter, embodiments of the disclosure will be described in detail with reference to the accompanying drawings. Although embodiments of the disclosure are described by using a method and apparatus corresponding to a service for enhancing coverage as an example, the embodiments of the disclosure may also be applied to a method of transmitting and receiving a data channel, a control channel, and a reference signal corresponding to other additional services through one or more embodiments or a combination of some embodiments of the disclosure. Accordingly, the embodiments of the disclosure may be applied through some modifications without departing from the scope of the disclosure by the judgement of one of ordinary skill in the art.

Also, in the following description of the disclosure, well-known functions or constructions are not described in detail in order to avoid unnecessarily obscuring the gist of the disclosure. The terms used herein are those defined in consideration of functions in the disclosure, and may vary according to the intention of users or operators, precedents, etc. Hence, the terms used herein have to be defined based on the meaning of the terms together with the descriptions throughout the specification.

A wireless communication system has evolved from an initial one that provides a voice-oriented service to a broadband wireless communication system that provides a high-speed and high-quality packet data service, using communication standards such as $3^{rd}$ generation partnership project (3GPP) high speed packet access (HSPA), long-term evolution (LTE) or evolved universal terrestrial radio access (E-UTRA), LTE-advanced (LTE-A), LTE-Pro, 3GPP2 high rate packet data (HRPD), ultra-mobile broadband (UMB), and the institute of electrical and electronics engineers (IEEE) 802.16e.

An LTE system, which is a representative example of a broadband wireless communication system, employs an orthogonal frequency division multiplexing (OFDM) scheme for a downlink (DL), and employs a single carrier frequency division multiple access (SC-FDMA) scheme for an uplink (UL). The term 'uplink' refers to a radio link through which a terminal (e.g., a user equipment (UE) or a mobile station (MS)) transmits data or a control signal to a base station (e.g., an eNode B (eNB) or a BS), and the term 'downlink' refers to a radio link through which a base station transmits data or a control signal to a terminal. The above-described multiple access schemes may identify data or control information of different users in a manner that time-frequency resources for carrying the data or control information of the users are assigned and managed not to overlap each other, that is, to achieve orthogonality therebetween.

As post-LTE communication systems, 5G systems should be able to freely reflect various requirements of users and service providers, and thus, services simultaneously satisfying the various requirements should be supported. Services considered for the 5G systems include enhanced mobile broadband (eMBB), massive machine-type communication (mMTC), and ultra-reliability low-latency communication (URLLC) services.

The eMBB aims to provide a higher data rate than a data rate supported by the existing LTE, LTE-A, or LTE-Pro. For example, in a 5G communication system, the eMBB should be able to provide a peak data rate of 20 Gbps in a downlink and a peak data rate of 10 Gbps in an uplink from the viewpoint of a base station. Also, the 5G communication system should be able to provide an increased user-perceived data rate of a terminal while providing the peak data rate. In order to satisfy such requirements, in the 5G communication system, various transmission and reception technologies including a further enhanced MIMO transmission technology need to be improved. Also, an LTE system transmits a signal by using a maximum transmission bandwidth of 20 megahertz (MHz) in a frequency band of 2 gigahertz (GHz). In contrast, the 5G communication system transmits a signal by using a frequency bandwidth wider than 20 MHz in a frequency band of 3 to 6 GHz or more, and thus, may satisfy the data rate requirements necessary for the 5G communication system.

Furthermore, the mMTC is considered to support application services such as Internet of Things (IoT) in the 5G communication system. In order to efficiently provide the IoT, the mMTC is required to support access to a large number of terminals in a cell, improved battery time, cost reduction of a terminal, etc. The IoT is attached to various sensors and various devices to provide a communication function, and thus, should be able to support many terminals (e.g., 1,000,000 terminals/km$^2$) within a cell. Also, because a terminal supporting the mMTC is likely to be located in a shaded area not covered by a cell such as an underground of a building due to nature of services, the terminal requires a wider coverage than other services provided by the 5G communication system. The terminal supporting the mMTC should be an inexpensive terminal, and because it is difficult to frequently replace a battery of the terminal, the terminal requires a very long battery lifetime (e.g., 10 to 15 years).

Lastly, the URLLC is a cellular-based wireless communication service used for mission-critical purposes. For example, the URLLC may be used in remote control of robots or machinery, industrial automation, unmanned aerial vehicles, remote health care, emergency alert, etc. Accordingly, communication provided by the URLLC should provide ultra-low latency and ultra-high reliability. For example, a service supporting the URLLC should meet an air interface latency of less than 0.5 milliseconds and have a packet error rate of $10^{-5}$ or less. Accordingly, for a service supporting the URLLC, the 5G system should provide a transmission time interval (TTI) less than that of other services, and allocate wide resources in a frequency band in order to ensure the reliability of a communication link.

Three services considered for the 5G communication system (hereinafter, interchangeably used with 5G system), that is, the eMBB, the URLLC, and the mMTC, may be multiplexed and transmitted in one system. In this case, in order to satisfy different requirements of the services, different transmission and reception schemes and different transmission and reception parameters may be used between the services.

A terminal in the disclosure may include a user equipment (UE), a mobile station (MS), a cellular phone, a smartphone, a computer, or a multimedia system capable of performing a communication function.

Also, in the disclosure, a controller may be designated as a processor.

Also, in the disclosure, a layer (or layer entity) may be referred to as an entity.

The disclosure relates to a method and apparatus for transmitting and receiving a channel and signal in a wireless communication system. According to an embodiment, the wireless communication system may refer to a wireless communication system operating by using time-division duplex (TDD).

The disclosure relates to a cellular wireless communication system, and relates to a method by which a terminal transmits an uplink channel and signal to a base station and a method of receiving a downlink channel and signal, in a TDD system.

The disclosure provides an efficient channel and signal transmitting/receiving method and apparatus in a mobile communication system so that, in a terminal and/or a node that is to transmit and receive uplink and downlink channels/signals (channels and/or signals), time domain resources of the uplink and downlink channel/signals are extended to enhance coverage and transmission and reception are efficiently performed.

A frame structure of a 5G system will be described in more detail with reference to the drawings.

FIG. 1 is a diagram illustrating a basic structure of a time-frequency domain that is a radio resource domain of a 5G system, according to an embodiment of the disclosure.

In FIG. 1, a horizontal axis represents a time domain and a vertical axis represents a frequency domain. In the time and frequency domain, a base unit of a resource is a resource element (RE) 101 and may be defined by one OFDM symbol 102 on a time axis and one subcarrier 103 on a frequency axis. In the frequency domain, $N_{sc}^{RB}$ (e.g., 12) consecutive REs may constitute one resource block (RB) 104. Also, in the time domain, $N_{symb}^{subframe}$ consecutive OFDM symbols may constitute one subframe 110.

Figure 2:
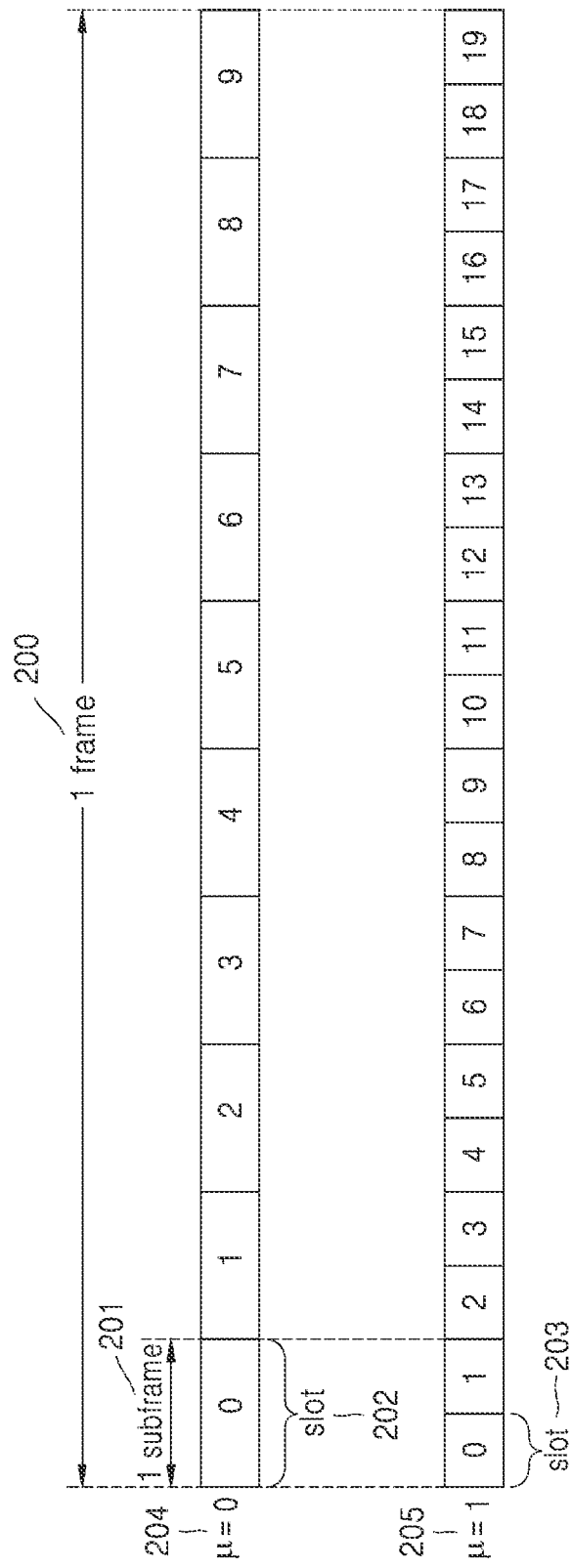
FIG. 2 is a diagram illustrating a structure of a slot considered in a 5G system, according to an embodiment of the disclosure.

FIG. 2 is a diagram illustrating a structure of a slot considered in a 5G system, according to an embodiment of the disclosure.

FIG. 2 illustrates an example of structures of a frame 200, a subframe 201, and a slot 202. One frame 200 may be defined to be 10 ms. One subframe 201 may be defined to be 1 ms, and thus, one frame 200 may include a total of 10 subframes 201. Also, one slot 202 or 203 may be defined by 14 OFDM symbols (i.e., the number of symbols per slot $N_{symb}^{slot}=14$). One subframe 201 may include one or more slots 202 and 203, and the number of slots 202 and 203 per subframe 201 may vary according to configuration values µ 204 and 205 for subcarrier spacing.

In an example of FIG. 2, a case where µ=0 204 and µ=1 205 are shown as the configuration values for subcarrier spacing is illustrated. When µ=0 204, one subframe 201 may include one slot 202, and when µ=1 205, one subframe 201 may include two slots 203. That is, the number of slots per subframe $N_{slot}^{subframe,\mu}$ may vary according to the configuration value µ for subcarrier spacing, and accordingly, the number of slots per frame $N_{slot}^{frame,\mu}$ may vary. $N_{slot}^{subframe,\mu}$ and $N_{slot}^{frame,\mu}$ according to the configuration µ for each subcarrier spacing may be defined as in Table 1.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In a 5G wireless communication system, for initial access, a synchronization signal block (synchronization signal block, SSB, SS block, and SS/PBCH block may be interchangeably used) may be transmitted, and the synchronization signal block may include a primary synchronization signal (PSS), a secondary synchronization signal (SSS), and a physical broadcast channel (PBCH). In an initial access step in which a terminal accesses a system for the first time, the terminal may first obtain downlink time and frequency domain synchronization from a synchronization signal through cell search and may obtain a cell ID. The synchronization signal may include a PSS and an SSS. Then, the terminal may receive a PBCH for transmitting a master information block (MIB) from a base station, and may obtain transmission and reception-related system information such as a system bandwidth or related control information and basic parameter values. The terminal may obtain a system information block (SIB) by decoding a physical downlink control channel (PDCCH) and a physical downlink shared channel (PDSCH) based on the information. Next, the terminal exchanges an identity with the base station through a random access step, and initially accesses a network through steps such as registration and authentication.

A cell initial access operation procedure of a 5G wireless communication system will be described in more detail with reference to the drawings.

According to an embodiment, a synchronization signal is a reference signal for cell search, and subcarrier spacing suitable for a channel environment such as phase noise may be applied to each frequency band. A 5G base station may transmit a plurality of synchronization signal blocks according to the number of analog beams to be operated. A PSS and an SSS may be mapped to and transmitted in 12 resource blocks (RBs), and a PBCH may be mapped to and transmitted in 24 RBs. A structure for transmitting a synchronization signal and a PBCH in a 5G communication system will now be described.

Figure 3:
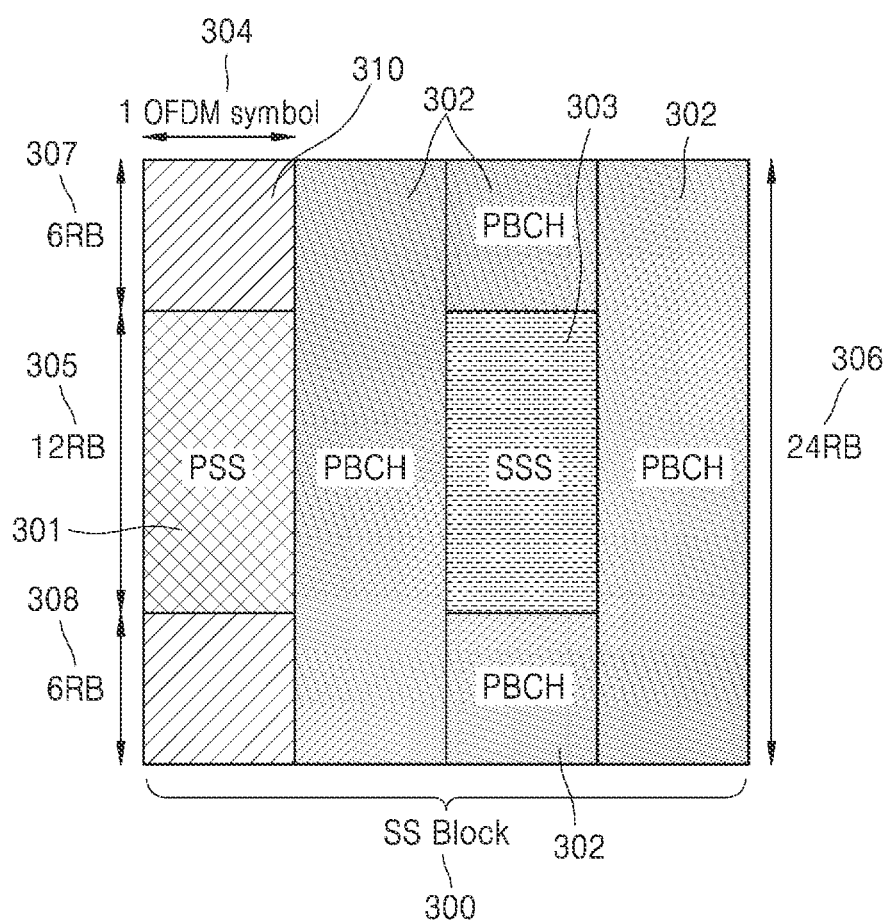
FIG. 3 is a diagram illustrating a synchronization signal block considered in a 5G communication system, according to an embodiment of the disclosure.

FIG. 3 is a diagram illustrating a synchronization signal block considered in a 5G communication system, according to an embodiment of the disclosure.

Referring to FIG. 3, a synchronization signal block 300 includes a PSS 301, an SSS 303, a PBCH 302.

As shown in FIG. 3, the synchronization signal block 300 may be mapped to four OFDM symbols on a time axis. The PSS 301 and the SSS 303 may be transmitted in the first and third OFDM symbols on the time axis and 12 RBs 305 on a frequency axis. In a 5G system, a total of 1008 different cell IDs may be defined, and the PSS 301 may have three different values according to a physical layer ID of a cell and the SSS 303 may have 336 different values. A terminal may obtain one of the 1008 cell IDs through a combination of the detected PSS 301 and SSS 303. This may be expressed by Equation 1.

$$N_{ID}^{cell}=3N_{ID}^{(1)}+N_{ID}^{(2)} \qquad \text{Equation 1}$$

In Equation 1, $N_{ID}^{(1)}$ may be estimated from the SSS 303 and may have a value between 0 and 335. $N_{ID}^{(2)}$ may be estimated from the PSS 301, and may have a value between 0 and 2. A $N_{ID}^{cell}$ value that is a cell ID may be estimated through a combination of $N_{ID}^{(1)}$ and $N_{ID}^{(2)}$.

The PBCH 302 may be transmitted in resources including 6 RBs 307 and 308 on both sides, except for 12 RBs at the center in which the SSS 303 is transmitted, in the second through fourth OFDM symbols of the SS block on the time axis and 24 RBs 306 on the frequency axis. Various system information called MIBs may be transmitted in the PBCH 302. In more detail, the MIB includes information as in Table 2 and a PBCH payload and a PBCH demodulation reference signal (DMRS) include the following additional information.

TABLE 2

| MIB ::= | SEQUENCE { |
|---|---|
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |
| pdcch-ConfigSIB1 | PDCCH-ConfigSIB1, |
| cellBarred | ENUMERATED {barred, notBarred}, |
| intraFreqReselection | ENUMERATED {allowed, notAllowed}, |
| spare | BIT STRING (SIZE (1)) |
| } | |

Synchronization signal block information: offset of a frequency domain of a synchronization signal block is indicated through 4 bits (ssb-SubcarrierOffset) in the MIB. An index of the synchronization signal block including the PBCH may be indirectly obtained by decoding the PBCH and PBCH DMRS. In more detail, in a frequency band of 6 GHz or less, 3 bits obtained by decoding the PBCH DRMS indicates the index of the synchronization signal block, and in a frequency band of 6 GHz or more, 3 bits obtained by decoding the PBCH DMRS and 3 bits included in the PBCH payload and obtained by decoding the PBCH, that is, a total of 6 bits, indicate the index of the synchronization signal block including the PBCH.

PDCCH information: subcarrier spacing of a common downlink control channel is indicated through 1 bit (subCarrierSpacingCommon) in the MIB, and time-frequency resource configuration information of a control resource set (CORESET) and a search space (SS) is indicated through 8 bits (pdcch-ConfigSIB1).

System frame number (SFN): 6 bits (systemFrameNumber) in the MIB is used to indicate a part of an SFN. 4 bits of least significant bits (LSB) of the SFN may be included in the PBCH payload, and may be indirectly obtained by the terminal by decoding the PBCH.

Timing information in a radio frame: 1 bit (half frame) included in the index of the synchronization signal block and the PBCH payload and obtained by decoding the PBCH. The terminal may indirectly identify whether the synchronization signal block is transmitted in a first or second half frame of the radio frame.

Because a transmission bandwidth (12 RBs 305) of the PSS 301 and the SSS 303 and a transmission bandwidth (24 RBs 306) of the PBCH 302 are different from each other, 6 RBs 307 and 308 on both sides, except for 12 RBs at the center in which the PSS 301 is transmitted, exist in the first OFDM symbol in which the PSS 301 is transmitted within the transmission bandwidth of the PBCH 302, and may be used to transmit other signals or may be empty.

All synchronization signal blocks may be transmitted by using the same analog beam. That is, the PSS 301, the SSS 303, and the PBCH 302 may be transmitted by using the same beam. Because an analog beam may not be differently applied to a frequency axis, the same analog beam is applied to all RBs on the frequency axis within a specific OFDM symbol to which a specific analog beam is applied. That is, all four OFDM symbols in which the PSS 301, the SSS 303, and the PBCH 302 are transmitted may be transmitted by using the same analog beam.

Figure 4:
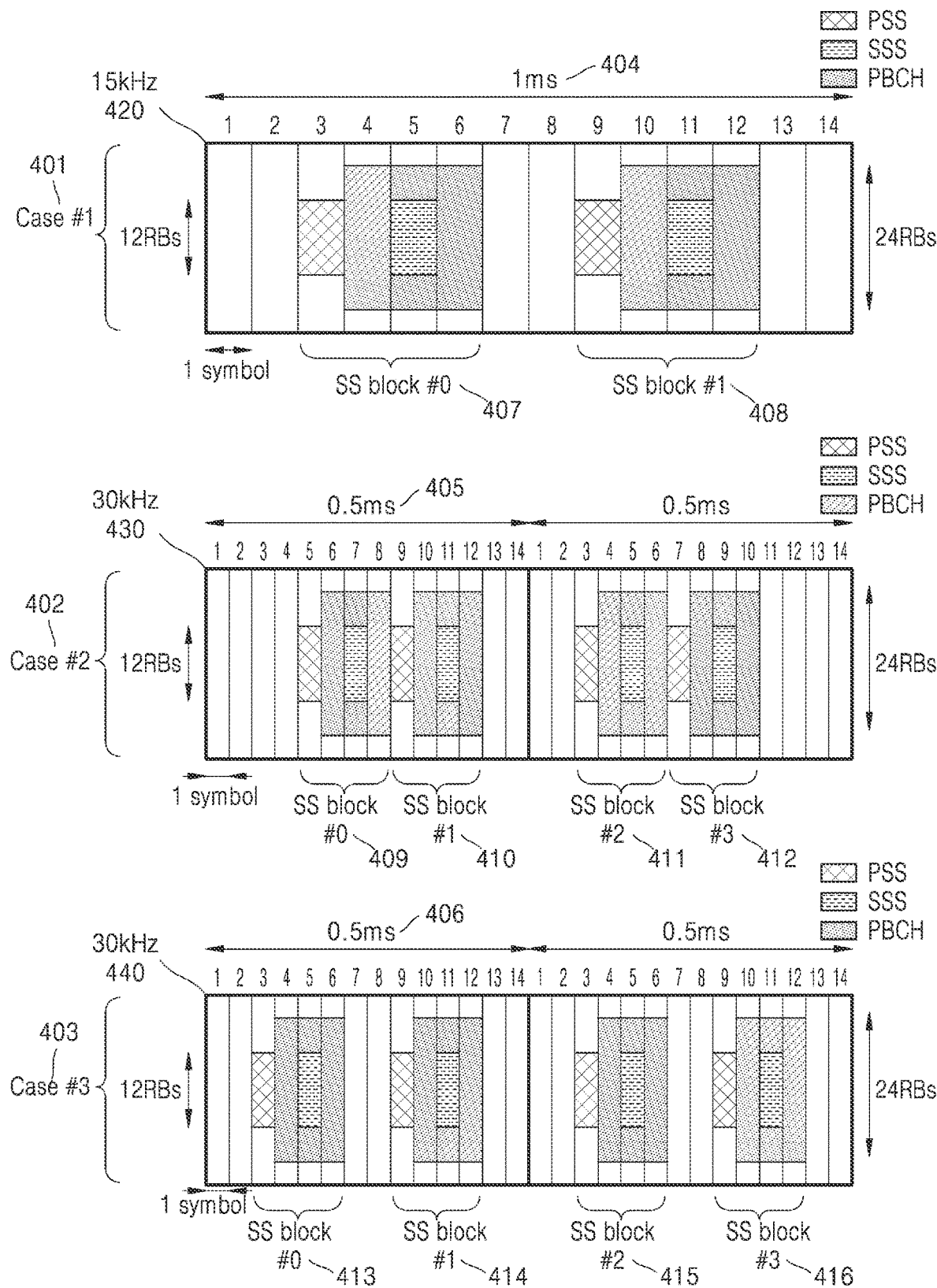
FIG. 4 is a diagram illustrating transmission cases of a synchronization signal block (SSB) in a frequency band of 6 GHz or less considered in a 5G communication system, according to an embodiment of the disclosure.

FIG. 4 is a diagram illustrating transmission cases of a synchronization signal block in a frequency band of 6 GHz or less considered in a 5G communication system, according to an embodiment of the disclosure.

Referring to FIG. 4, in a 5G communication system, in a frequency band of 6 GHz or less, subcarrier spacing (SCS) of 15 kHz 420 and subcarrier spacing of 30 kHz 430 and 440 may be used to transmit a synchronization signal block. One transmission case case #1 401 for a synchronization signal block may exist in the subcarrier spacing of 15 kHz, and two transmission cases case #2 402 and case #3 403 for a synchronization signal block may exist in the subcarrier spacing of 30 kHz.

In the case #1 401 in the subcarrier spacing of 15 kHz 420, up to two synchronization signal blocks may be transmitted within a time of 1 ms 404 (or a length of one slot when one slot includes 14 OFDM symbols). In an example of FIG. 4, a synchronization signal block #0 407 and a synchronization signal block #1 408 are illustrated. In this case, the synchronization signal block #0 407 may be mapped to four consecutive symbols from a third OFDM symbol, and the synchronization signal block #1 408 may be mapped to four consecutive symbols from a ninth OFDM symbol.

Different analog beams may be applied to the synchronization signal block #0 407 and the synchronization signal block #1 408. Accordingly, the same beam may be applied to the third through sixth OFDM symbols to which the synchronization signal block #0 407 is mapped, and the same beam may be applied to the ninth through twelfth OFDM symbols to which the synchronization signal block #1 408 is mapped. Beams to be used for seventh, eighth, thirteenth, and fourteenth OFDM symbols to which no synchronization signal block is mapped may be freely determined at the discretion of a base station.

In the case #2 402 in the subcarrier spacing of 30 kHz 430, up to two synchronization signal blocks may be transmitted within a time of 0.5 ms 405 (or a length of one slot when one slot includes 14 OFDM symbols), and thus, up to four synchronization signal blocks may be transmitted within a time of 1 ms (or a length of two slots when one slot includes 14 OFDM symbols). In the example of FIG. 4, a synchronization signal block #0 409, a synchronization signal block #1 410, a synchronization signal block #2 411, and a synchronization signal block #3 412 are transmitted within 1 ms (i.e., two slots). In this case, the synchronization signal block #0 409 and the synchronization signal block #1 410 may be respectively mapped to consecutive symbols from a fifth OFDM symbol and a ninth OFDM symbol of a first slot, and the synchronization signal block #2 411 and the synchronization signal block #3 412 may be respectively mapped to consecutive symbols from a third OFDM symbol and a seventh OFDM symbol of a second slot.

Different analog beams may be applied to the synchronization signal block #0 409, the synchronization signal block #1 410, the synchronization signal block #2 411, and the synchronization signal block #3 412. Accordingly, the same analog beams may be respectively applied to the fifth through eighth OFDM symbols of the first slot in which the synchronization signal block #0 409 is transmitted, to the ninth through twelfth OFDM symbols of the first slot in which the synchronization signal block #1 410 is transmitted, to the third through sixth symbols of the second slot in which the synchronization signal block #2 411 is transmitted, and to the seventh through tenth symbols of the second slot in which the synchronization signal block #3 412 is transmitted. Beams to be used for OFDM symbols to which no synchronization signal block is mapped may be freely determined at the discretion of the base station.

In the case #3 403 in the subcarrier spacing of 30 kHz 440, up two synchronization signal blocks may be transmitted within a time of 0.5 ms 406 (or a length of one slot when one slot includes 14 OFDM symbols), and thus, up to four synchronization signal blocks may be transmitted within a time of 1 ms (or a length of two slots when one slot includes 14 OFDM symbols). In the example of FIG. 4, a synchronization signal block #0 413, a synchronization signal block #1 414, a synchronization signal block #2 415, and a synchronization signal block #3 416 are transmitted within 1 ms (i.e., two slots). In this case, the synchronization signal block #0 413 and the synchronization signal block #1 414 may be respectively mapped to consecutive symbols from a third OFDM symbol and a ninth OFDM symbol of a first slot, and the synchronization signal block #2 415 and a synchronization signal block #3 416 may be respectively mapped to consecutive symbols from a third OFDM symbol and a ninth OFDM symbol of a second slot.

Different analog beams may be used for the synchronization signal block #0 413, the synchronization signal block

1 414, the synchronization signal block #2 415, and the synchronization signal block #3 416. As described above, the same analog beam may be used for all four OFDM symbols in which each synchronization signal block is transmitted, and beams to be used for OFDM symbols to which no synchronization signal block is mapped may be freely determined at the discretion of the base station.

FIG. 5 is a diagram illustrating transmission cases of a synchronization signal block in a frequency band of 6 GHz or more considered in a 5G communication system, according to an embodiment of the disclosure.

Referring to FIG. 5, in a 5G communication system, in a frequency band of 6 GHz or more, subcarrier spacing of 120 kHz 530 and subcarrier spacing of 240 kHz 540 may be used to transmit a synchronization signal block.

In a case #4 550 in the subcarrier spacing of 120 kHz 530, up to four synchronization signal blocks may be transmitted within a time of 0.25 ms 501 (or a length of two slots when one slot includes 14 OFDM symbols). In an example of FIG. 5, a synchronization signal block #0 503, a synchronization signal block #1 504, a synchronization signal block #2 505, and a synchronization signal block #3 506 are transmitted within 0.25 ms (i.e., two slots). In this case, the synchronization signal block #0 503 and the synchronization signal block #1 504 may be respectively mapped to consecutive symbols from a fifth OFDM symbol and a ninth OFDM symbol of a first slot, and the synchronization signal block #2 505 and the synchronization signal block #3 506 may be respectively mapped to consecutive symbols from a third OFDM symbol and a seventh OFDM symbol of a second slot.

Different analog beams may be used for the synchronization signal block #0 503, the synchronization signal block #1 504, the synchronization signal block #2 505, and the synchronization signal block #3 506 as described above. The same analog beam may be used for all four OFDM symbols in which each synchronization signal block is transmitted, and beams to be used for OFDM symbols to which no synchronization signal block is mapped may be freely determined at the discretion of a base station.

In a case #5 560 in the subcarrier spacing of 240 kHz 540, up to eight synchronization signal blocks may be transmitted within a time of 0.25 ms 502 (or a length of four slots when one slot includes 14 OFDM symbols). In the example of FIG. 5, a synchronization signal block #0 507, a synchronization signal block #1 508, a synchronization signal block #2 509, a synchronization signal block #3 510, a synchronization signal block #4 511, a synchronization signal block #5 512, a synchronization signal block #6 513, and a synchronization signal block #7 514 are transmitted within 0.25 ms (i.e., four slots). In this case, the synchronization signal block #0 507 and the synchronization signal block #1 508 may be respectively mapped to consecutive symbols from a ninth OFDM symbol and a thirteenth OFDM symbol of a first slot, the synchronization signal block #2 509 and the synchronization signal block #3 510 may be respectively mapped to consecutive symbols from a third OFDM symbol and a seventh OFDM symbol of a second slot, the synchronization signal block #4 511, the synchronization signal block #5 512, and the synchronization signal block #6 513 may be respectively mapped to consecutive symbols from a fifth OFDM symbol, a ninth OFDM symbol, and a thirteenth OFDM symbol of a third slot, and the synchronization signal block #7 514 may mapped to consecutive symbols from a third OFDM symbol of a fourth slot.

As described above, different analog beams may be used for the synchronization signal block #0 507, the synchronization signal block #1 508, the synchronization signal block #2 509, the synchronization signal block #3 510, the synchronization signal block #4 511, the synchronization signal block #5 512, the synchronization signal block #6 513, and the synchronization signal block #7 514. The same analog beam may be used for all four OFDM symbols in which each synchronization signal block is transmitted, and beams to be used for OFDM symbols to which no synchronization signal block is mapped may be freely determined at the discretion of the base station.

Figure 6:
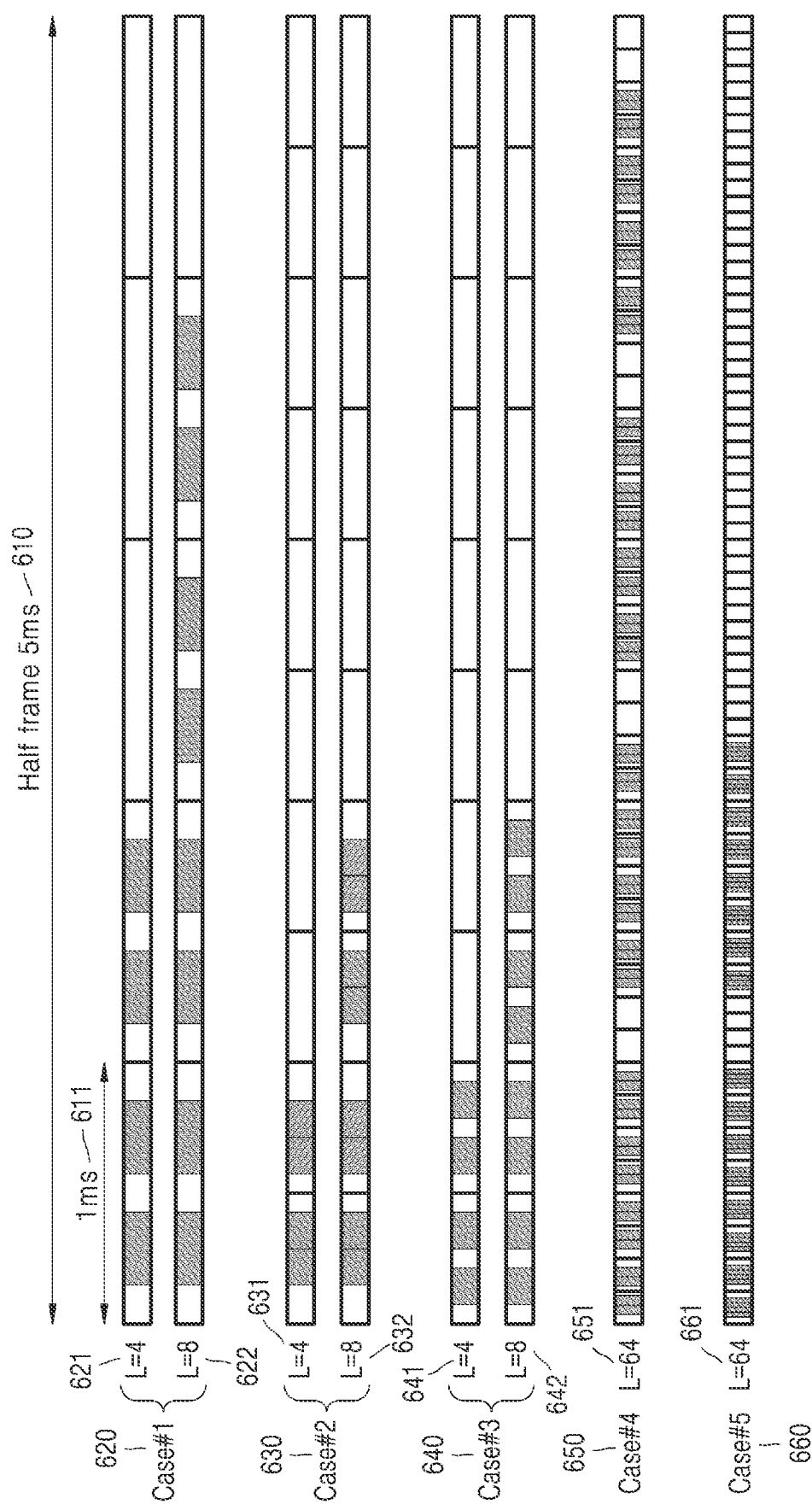
FIG. 6 is a diagram illustrating transmission cases of a synchronization signal block according to subcarrier spacing (SCS) within a time of 5 ms, according to an embodiment of the disclosure.

FIG. 6 is a diagram illustrating transmission cases of a synchronization signal block according to subcarrier spacing within a time of 5 ms, according to an embodiment of the disclosure. In a 5G communication system, a synchronization signal block may be periodically transmitted in units of 5 ms (corresponding to 5 subframes or half frame) 610.

In a frequency band of 3 GHz or less, up to four synchronization signal block may be transmitted within a time of 5 ms 610. In a frequency band of 3 GHz or more and 6 GHz or less, up to eight synchronization signal blocks may be transmitted. In a frequency band of 6 GHz or more, up to 64 synchronization signal blocks may be transmitted. As described above, subcarrier spacing of 15 kHz and 30 kHz may be used in a frequency of 6 GHz or less.

In an example of FIG. 6, in the subcarrier spacing of 15 kHz including one slot of FIG. 4, a case #1 401 may be mapped to a first slot and a second slot in a frequency band of 3 GHz or less, and thus, up to 4 synchronization signal blocks 621 may be transmitted, and the case may be mapped to first, second, third, and fourth slots in a frequency band of 3 GHz or more and 6 GHz or less, and thus, up to eight synchronization signal blocks 622 may be transmitted. In the subcarrier spacing of 30 kHz including two slots of FIG. 4, a case #2 402 or a case #3 403 may be mapped to consecutive slots from a first slot in a frequency band of 3 GHz or less, and thus, four synchronization signal blocks 631 and 641 may be transmitted, and the case may be mapped to consecutive slots from first and third slots in a frequency band of 3 GHz or more and 6 GHz or less, and thus, up to eight synchronization signal blocks 632 and 642 may be transmitted.

Subcarrier spacing of 120 kHz and 240 kHz may be used in a frequency of 6 GHz or more. In the example of FIG. 6, in the subcarrier spacing of 120 kHz including two slots of FIG. 5, a case #4 550 may be mapped to consecutive slots from $1^{st}$, $3^{rd}$, $5^{th}$, $7^{th}$, $11^{th}$, $13^{th}$, $15^{th}$, $17^{th}$, $21^{st}$, $23^{rd}$, $25^{th}$, $27^{th}$, $31^{st}$, $33^{rd}$, $35^{th}$, and $37^{th}$ slots in a frequency band of 6 GHz or more, and thus, up to 64 synchronization signal blocks 651 may be transmitted. In the example of FIG. 6, in the subcarrier spacing 240 kHz including four slots of FIG. 5, a case #5 560 may be mapped to consecutive slots from $1^{st}$, $5^{th}$, $9^{th}$, $13^{th}$, $21^{st}$, $25^{th}$, $29^{th}$, $33^{rd}$ slots, and thus, up to 64 synchronization signal blocks 661 may be transmitted.

Actually transmitted synchronization signal block indication information included in a system will now be described in detail with reference to FIG. 7. As described above, actually transmitted synchronization signal block indication information may be obtained from system information called an SIB, and may also be obtained through higher layer signaling. The actually transmitted synchronization signal block indication information included in the system information may be indicated by 8 bits to indicate whether up to eight synchronization signal blocks are transmitted in a frequency band of 6 GHZ or less, and may be indicated by a total of 16 bits to indicate whether up to 64 synchronization signal blocks 710 are transmitted in a frequency band of 6 GHz or more. In more detail, in a frequency band of 6 GHz or less, one bit may indicate whether one synchronization signal block is transmitted. When a first MSB is 1, it may be indicated that a first synchronization signal block is actually transmitted from a base station, and when the first MSB is 0, it may be indicated that the first synchronization signal block is not transmitted from the base station.

Figure 7:
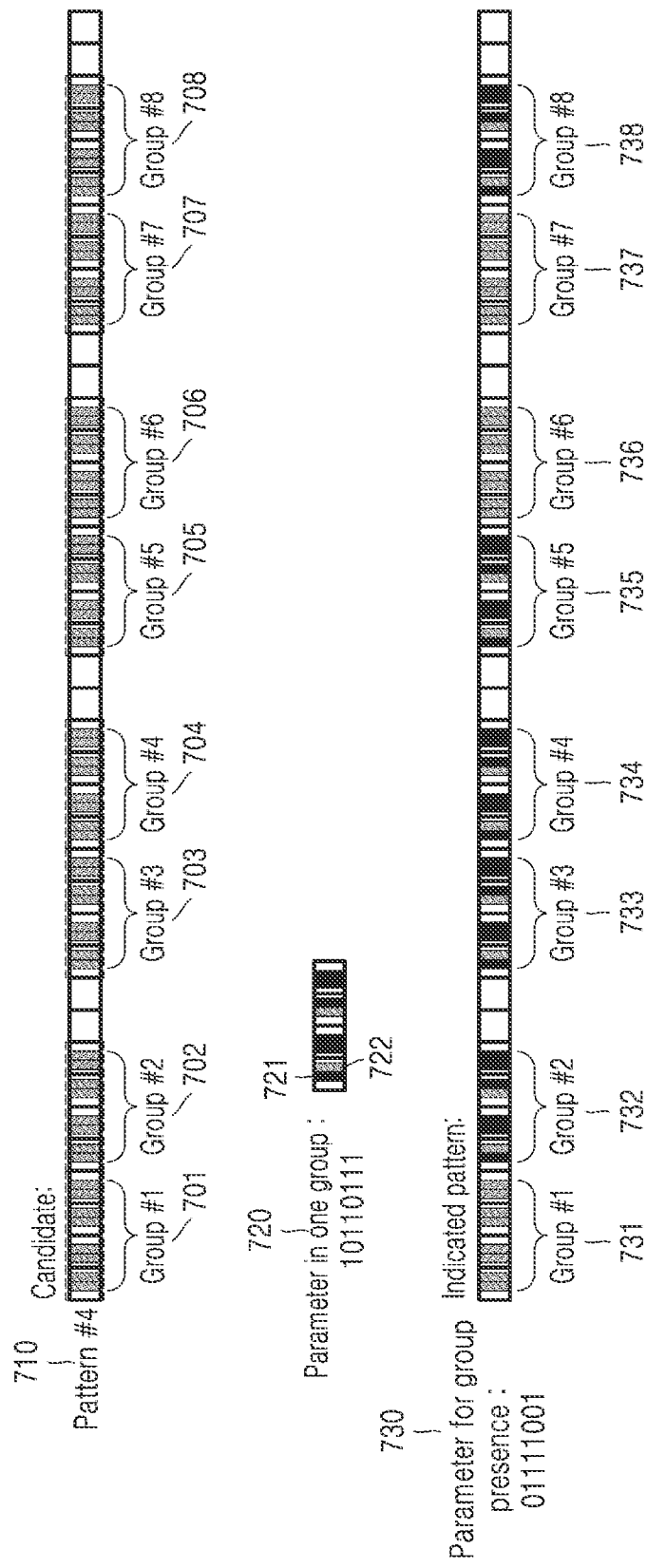
FIG. 7 is a diagram illustrating synchronization signal block information actually transmitted through system information in a 5G communication system, according to an embodiment of the disclosure.

FIG. 7 is a diagram illustrating synchronization signal block information actually transmitted through system information in a 5G communication system, according to an embodiment of the disclosure. That is, FIG. 7 is a diagram illustrating a specific example of a case where a synchronization transmission block is transmitted on a 120 kHz subcarrier in a frequency band of 6 GHz or more.

Referring to FIG. 7, in a frequency band of 6 GHz or more, in order to indicate whether up to 64 synchronization signal blocks are transmitted, eight synchronization signal blocks may be combined into one group, and a total of eight groups, i.e., first through eighth groups 701, 702, 703, 704, 705, 706, 707, and 708, may be obtained. Accordingly, eight bits 720 indicating whether eight synchronization signal blocks in one group are transmitted and eight bits 730 indicating presences of eight groups, that is, a total of 16 bits, may be expressed. The eight bits 720 indicating whether synchronization signal blocks in one group are transmitted may indicate one pattern (e.g., eight bits 720) in the same manner as in a frequency band of 6 GHz or less. In detail, in case that a first MSB is 1, it may be indicated that a first synchronization signal block is transmitted by a base station (721). Also, in case that a second MSB is 0, it may be indicated that a second synchronization signal block is not actually transmitted by the base station (722). In the eight bits 730 indicating presences of eight groups, in case that a first MSB is 0, it may be indicated that all eight synchronization signal blocks in a first group Group #1 731 are not transmitted (e.g., Group #1 731). In case that a second MSB is 1, it may be indicated that eight synchronization signal blocks in a second group Group #2 732 are transmitted in a transmission pattern (e.g., eight bits 720) of eight consecutive synchronization signal blocks in one configured group (e.g., Group #2 732). In actually transmitted synchronization signal block indication information transmitted through higher layer signaling, instead of system information, in order to indicate whether up to 64 synchronization block signals are transmitted regardless of a frequency band, one bit indicate whether one synchronization signal block is transmitted. For example, the synchronization signal block indication information may indicate whether synchronization signal blocks are transmitted with a total of 64 bits.

A terminal may perform decoding a PDCCH and a PDSCH based on system information included in a received MIB, and then may obtain an SIB. The SIB may include at least one of an uplink cell bandwidth, a random access parameter, a paging parameter, or an uplink power control-related parameter. The terminal may establish a radio link with a network through a random access process based on the system information and synchronization with the network obtained in a cell search process of a cell. A contention-based method or a contention-free method may be used as random access. In case that the terminal performs cell selection and reselection in an initial access step of the cell, for purposes such as moving from an RRC IDLE state to an RRC CONNECTED state, the contention-based access may be used. The contention-free random access method may be when downlink data arrives, when handover occurs, or when uplink synchronization is reconfigured in the case of position measurement.

A 4-step random access procedure (RACH procedure) will now be described in detail with reference to FIG. 8.

Figure 8:
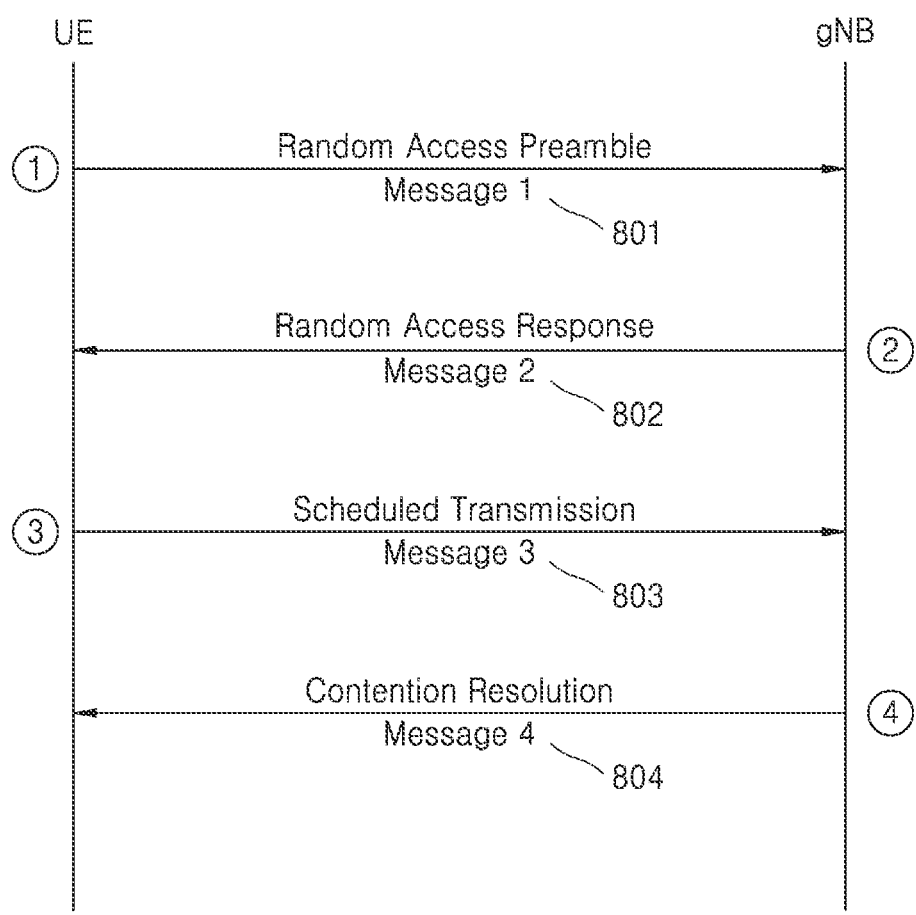
FIG. 8 is a diagram illustrating a 4-step random access procedure, according to an embodiment of the disclosure.

FIG. 8 is a diagram illustrating a 4-step random access procedure, according to an embodiment of the disclosure. Referring to FIG. 8, in a first step 801 of a random access procedure, a UE transmits a random access preamble or a message 1 to a gNB. The gNB measures a transmission delay value between the UE and the gNB, and performs uplink synchronization. In this case, the UE transmits a random access preamble that is randomly selected in a random access preamble set given by system information in advance. Initial transmission power of the random access preamble is determined according to pathloss between the gNB and the UE measured by the UE. Also, the UE determines a transmission beam direction (or a transmission beam or a beam) based on a synchronization signal (or SSB) from the gNB, and transmits the random access preamble by applying the determined transmission beam direction.

In a second step 802, the gNB transmits a response (random access response (RAR) or message 2) to the detected random access attempt to the UE. The gNB transmits an uplink transmission timing control command to the UE from the transmission delay value measured from the random access preamble received in the first step. Also, the gNB transmits a power control command and an uplink resource to be used by the UE as scheduling information. According to an embodiment, control information about an uplink transmission beam of the UE may be included in the scheduling information. The RAR may be transmitted through a PDSCH and may include the following information.

Random access preamble sequence index detected by a network (or gNB)
Temporary cell radio network temporary identifier (TC-RNTI)
Uplink scheduling grant
Timing advance value When the UE does not receive the RAR that is scheduling information for a message 3 in the second step 802 from the gNB for a certain time, the first step 801 is performed again. When the first step is performed again, the UE increases transmission power of the random access preamble by a certain step and transmits the increased transmission power (referred to as power ramping), to increase the probability that the gNB receives the random access preamble.

In a third step 803, the UE transmits uplink data including a UE identifier of the UE (scheduled transmission or message 3) to the gNB, by using the uplink resource received in the second step 802 through an uplink data channel (physical uplink shared channel (PUSCH)). A transmission timing of the uplink data channel for transmitting the message 3 follows the uplink transmission timing control command received from the gNB in the second step 802. Also, transmission power of the uplink data channel for transmitting the message 3 is determined by considering a power ramping value of the random access preamble and the power control command received from the gNB in the second step 802. The uplink data channel for transmitting the message 3 may be a first uplink data signal transmitted by the UE to the gNB after the UE transmits the random access preamble.

Lastly, in a fourth step 804, when it is determined that the UE performs random access without collision with another UE, the gNB transmits data (contention resolution message or message 4) including the identifier of the UE transmitting the uplink data in the third step 803 to the UE. When the UE receives the signal transmitted by the gNB in the fourth step 804, it is determined that the random access is successful.

The UE transmits HARQ-ACK/NACK indicating whether the message 4 is successfully received to the gNB through a physical uplink control channel (PUCCH).

When data transmitted by the UE in the third step 803 and data of another UE collide with each other and thus the gNB fails to receive a data signal from the UE, the gNB does not perform further data transmission to the UE. Accordingly, when the UE fails to receive data transmitted from the gNB in the fourth step 804 for a certain time, it is determined that the random access procedure has failed and the first step 801 is started again.

As described above, in the first step 801 of the random access process, the UE may transmit the random access preamble on a PRACH. Each cell may have 64 available preamble sequences, and four long preamble formats and nine short preamble formats may be used according to a transmission type. The UE generates 64 preamble sequence by using a root sequence index and a cyclic shift value signaled by system information, randomly selects one sequence, and uses the sequence as a preamble.

The network may notify the UE of which time-frequency resource may be used for the PRACH by using an SIB or higher layer signaling. A frequency resource indicates a start RB point of transmission to the UE, and the number of RBs used is determined according to a preamble format and applied subcarrier spacing. As shown in Table 3, a time resource may indicate a preset PRACH configuration period, a subframe index including a PRACH occasion (PRACH occasion and transmission occasion may be interchangeably used) and a starting symbol, and the number of PRACH occasions in a slot through a PRACH configuration index (0 to 255). Through the PRACH configuration index, random access configuration information included in the SIB, and an index of an SSB selected by the UE, the UE may identify time and frequency resources for transmitting a random access preamble and may transmit a selected sequence as a preamble to the gNB.

Figure 9:
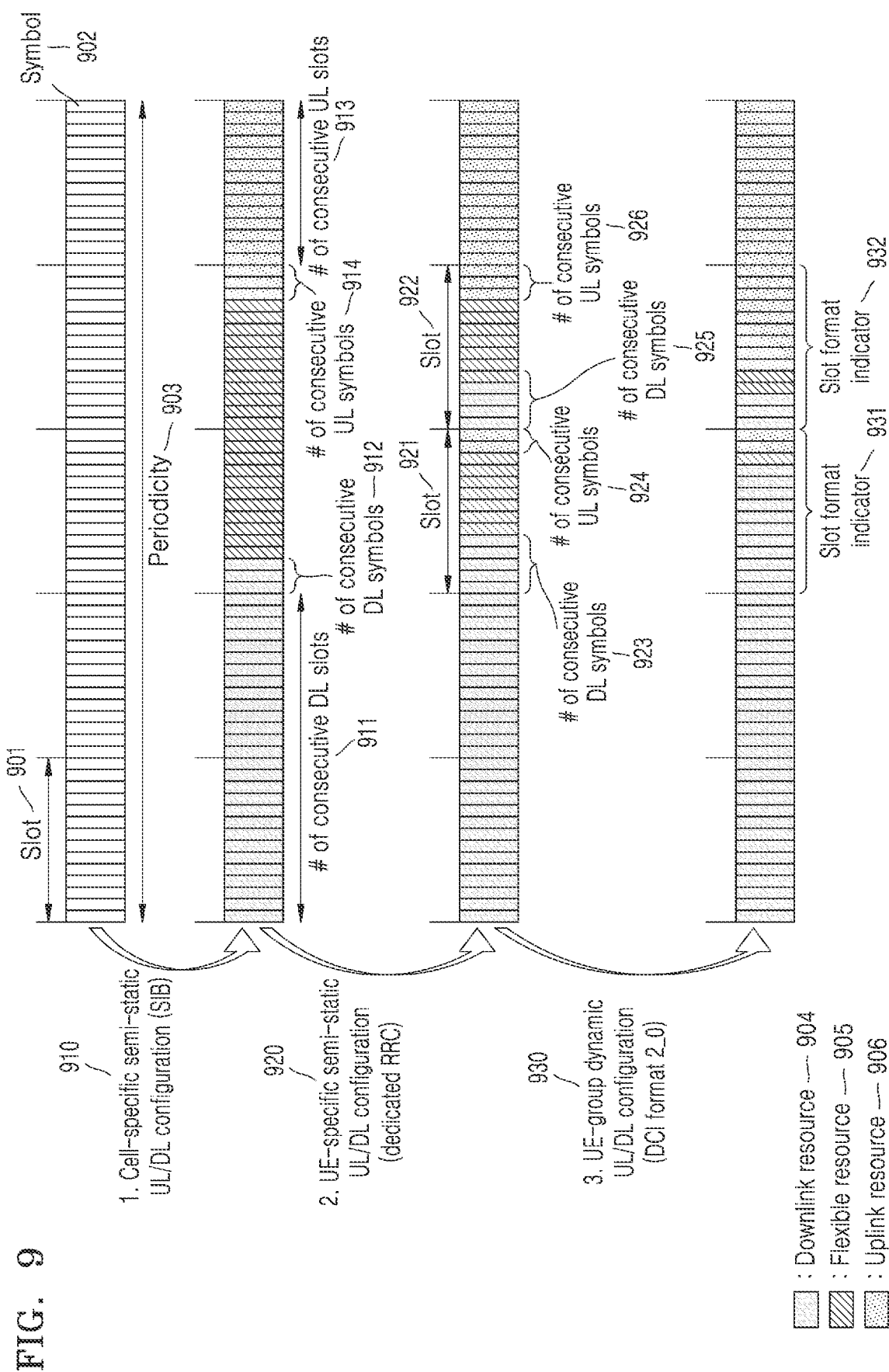
FIG. 9 is a diagram illustrating an uplink-downlink configuration considered in a 5G communication system, according to an embodiment of the disclosure.

FIG. 9 is a diagram illustrating an uplink-downlink configuration considered in a 5G communication system, according to an embodiment of the disclosure.

Referring to FIG. 9, a slot 901 may include 14 symbols 902. In a 5G communication system, an uplink-downlink configuration of a symbol/slot may be configured in three steps. Firstly, uplink-downlink of the symbol/slot may be configured, through cell-specific semi-static uplink-downlink configuration information 910 through system information in a symbol unit. In detail, uplink-downlink pattern information and reference subcarrier information may be included in the cell-specific uplink-downlink configuration information through the system information. In the uplink-downlink pattern information, a pattern periodicity 903, the number of consecutive downlink slots 911 from a start point of each pattern, the number of symbols 912 of a next slot, the number of consecutive uplink slots 913 from an end of the pattern, and the number of symbols 914 of a next slot may be indicated. In this case, a slot/symbol not indicated as uplink and downlink may be determined as a flexible slot/symbol.

Secondly, through user-specific configuration information through dedicated higher layer signaling, slots 921 and 922 including a flexible slot or a flexible symbol may be respectively indicated by the numbers of consecutive downlink symbols 923 and 925 each from a starting symbol of each slot and by the numbers of consecutive uplink symbols 924 and 926 each from an end of the slot, or may be indicated by entire slot downlink or entire slot uplink.

Also, lastly, in order to dynamically change a downlink signal transmission interval and an uplink signal transmission interval, regarding symbols indicated as flexible symbols in each slot (i.e., symbols not indicated as downlink and uplink), it may be indicated whether each is a downlink symbol, an uplink symbol, or a flexible symbol through slot format indicators (SFI) 931 and 932 included in a downlink control channel. The slot format indicator may select one index in a table in which an uplink-downlink configuration of 14 symbols in one slot is pre-configured as in Table 4.

TABLE 3

| PRACH configuration index | Preamble format | $n_{SFN}$ mod x = y | | Subframe number | Starting symbol | Number of PRACH slots within a subframe | number of time-domain PRACH occasions within a PRACH slot | PRACH duration |
|---|---|---|---|---|---|---|---|---|
| | | x | y | | | | | |
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| 5 | 0 | 8 | 1 | 4 | 0 | — | — | 0 |
| 6 | 0 | 8 | 1 | 7 | 0 | — | — | 0 |
| 7 | 0 | 8 | 1 | 9 | 0 | — | — | 0 |
| 8 | 0 | 4 | 1 | 1 | 0 | — | — | 0 |
| 9 | 0 | 4 | 1 | 4 | 0 | — | — | 0 |
| 10 | 0 | 4 | 1 | 7 | 0 | — | — | 0 |
| ... | | | | | ... | | | |
| 104 | A1 | 1 | 0 | 1, 4, 7 | 0 | 2 | 6 | 2 |
| ... | | | | | ... | | | |
| 251 | C | 1 | 0 | 2, 7 | 0 | 2 | 2 | 6 |
| 252 | C2 | 1 | 0 | 1, 4, 7 | 0 | 2 | 2 | 6 |
| 253 | C2 | 1 | 0 | 0, 2, 4, 6, 8 | 0 | 2 | 2 | 6 |
| 254 | C2 | 1 | 0 | 0, 1, 2, 3, 4, 5, 6, 7, 8, 9 | 0 | 2 | 2 | 6 |
| 255 | C2 | 1 | 0 | 1, 3, 5, 7, 9 | 0 | 2 | 2 | 6 |

TABLE 4

| Format | \multicolumn{14}{c}{Symbol number in a slot} |
|---|---|

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | F | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | F | F | U | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | \multicolumn{14}{c}{Reserved} |
| 255 | \multicolumn{14}{l}{UE determines the slot format for the slot based on TDD-UL-DL-ConfigurationCommon, or TDD-UL-DL-ConfigDedicated and, if any, on detected DCI formats} |

For a 5G mobile communication service, additional coverage extension technology was introduced compared to an LTE communication service, but the actual coverage of the 5G mobile communication service may generally use a TDD system suitable for a service with a high downlink traffic proportion. Also, as a center frequency is increased to increase a frequency band, a coverage of a base station and a terminal is reduced, and thus, coverage enhancement is a core requirement of the 5G mobile communication service. In particular, because transmission power of a terminal is generally lower than transmission power of a base station, it is necessary to support a service with a high downlink traffic proportion, and a ratio of downlink in a time domain is higher than that of uplink, coverage enhancement of an uplink channel is a core requirement of the 5G mobile communication service. Examples of a method of physically enhancing the coverage of an uplink channel between a base station and a terminal may include a method of increasing a time resource of the uplink channel, a method of reducing a center frequency, and a method of increasing transmission power of the terminal. However, changing a frequency may have a limitation because a frequency band is determined for each network operator. Also, increasing maximum transmission power of the terminal may have a limitation because a maximum value is determined to reduce interference, that is, maximum transmission power of the terminal is regulatively determined.

Accordingly, for coverage enhancement of the base station and the terminal, uplink and downlink resources may be divided even in a frequency domain as in an FDD system, rather than dividing uplink and downlink resources in a time domain according to traffic proportions of uplink and downlink in a TDD system. In an embodiment, a system for flexibly dividing uplink and downlink resources in a time domain and a frequency domain may be referred to as an XDD system, a flexible TDD system, a hybrid TDD system, a TDD-FDD system, or a hybrid TDD-FDD system, and for convenience of explanation, is described as an XDD system in the disclosure. According to an embodiment, X in XDD may denote a time or a frequency.

FIG. 10 is a diagram illustrating an uplink-downlink configuration of an XDD system in which uplink and downlink resources are flexibly divided in time and frequency domains, according to an embodiment of the disclosure.

Referring to FIG. 10, from the viewpoint of a base station, in an uplink-downlink configuration 1000 of an XDD system, in an entire frequency band 1001, resources may be flexibly allocated for each symbol or slot 1002, according to traffic proportions of uplink and downlink. In this case, a guard band 1005 may be allocated between frequency bands of a downlink resource 1003 and an uplink resource 1004. The guard band may be allocated to reduce interface in uplink channel or signal reception due to out-of-band (OOB) emission occurring when the base station transmits a downlink channel or signal in the downlink resource 1003. In this case, for example, a UE 1 1010 and a UE 2 1020 having more downlink traffic than uplink traffic by a configuration of the base station may be allocated a downlink and uplink resource ratio of 4:1 in a time domain. Also, a UE 3 1030 operating at a cell edge and lacking uplink coverage may be allocated only an uplink resource in a specific time interval by a configuration of the base station. In addition, a UE4 1040 operating a cell edge and lacking uplink coverage but having relatively large downlink and uplink traffic may be allocated a lot of uplink resources in a time domain and a lot of downlink resources in a frequency band for uplink coverage. As in the above example, more downlink resources in a time domain may be allocated to UEs that operate relatively at the cell center and have large downlink traffic, and more uplink resources in a time domain may be allocated to UEs that operate relatively at a cell edge and lack uplink coverage.

The disclosure provides a method and apparatus for transmitting and receiving a channel and signal between a base station and a terminal, in an XDD system in which uplink and downlink resources are flexibly allocated in time and frequency domains according to traffic proportions of uplink and downlink in a 5G mobile communication system.

Although the disclosure provides a method and apparatus for transmitting and receiving a channel and signal between a base station and a terminal for coverage enhancement, the disclosure may also be applied to a method and apparatus for transmitting and receiving a channel and signal for services (e.g., URLLC) that may be provided by a 5G system for purposes other than coverage enhancement. Also, although the disclosure provides a method and apparatus for transmitting and receiving a channel and signal between a base station and a terminal in an XDD system, the disclosure is not limited to the XDD system, and may also be applied to a method and apparatus for transmitting and receiving a channel and signal in another division duplex system which may be provided by a 5G system.

First Embodiment

First Embodiment of the disclosure relates to a method by which a terminal transmits a channel or signal, in case that a time domain position where a synchronization signal block is transmitted is configured in an XDD system. Through an uplink channel or signal transmitting method of the present embodiment, in case that a base station transmits an indicator (an indicator transmitting method and an operation using an indicator are described in Fourth Embodiment), a time domain resource in which the terminal may transmit uplink may be increased, thereby enhancing uplink coverage between the terminal and the base station.

In detail, as described above, a time domain position where a synchronization signal block is transmitted may be configured, through cell-specific configuration information and higher layer signaling through system information. In this case, in a time domain in which a synchronization signal block is transmitted, because the synchronization signal block used for initial access, synchronization, and beam reception and having a high priority should be transmitted by a base station as downlink, a TDD system in which uplink and downlink resources are basically allocated through a time domain may not transmit an uplink channel and signal of the terminal in the same symbol(s). In this case, as described above, when there are more downlink resources than uplink resources in the time domain, an uplink coverage problem between the base station and the terminal may occur.

To solve this problem, as described above, because an XDD system allows uplink and downlink resources to be divided and allocated not only in a time domain but also in a frequency domain, a base station may transmit a synchronization signal block and terminals that should perform initial access, synchronization, and beam reception may receive the synchronization signal block. Also, the terminal may transmit an uplink channel and signal in a frequency band allocated as an uplink resource in the same symbol(s) in which the synchronization signal block is transmitted. However, in the XDD system, when compared to an FDD system, because uplink and downlink resources are relatively close in a frequency band, interference due to OOB emission may occur. In the present embodiment, a channel or signal transmitted as uplink by a terminal may interfere with another terminal receiving a synchronization signal block in the vicinity.

Accordingly, the disclosure provides a method by which, in case that a time domain position where a synchronization signal block is transmitted is configured in an XDD system, a terminal determines whether to transmit an uplink channel and signal in the same symbol(s)/slot(s) in which the synchronization signal block is transmitted.

The following methods may be considered as a method by which a terminal determines whether to transmit an uplink channel and signal in an XDD system.

Method 1

When a terminal is configured with an XDD indicator (defined in Fourth Embodiment), the terminal may transmit, at a time domain position where a synchronization signal block is transmitted, an uplink data channel, control channel, random access channel, and sounding reference signal (SRS) through higher layer signaling and an uplink data, control, random access channel, or SRS scheduled through downlink control information format 0_0, 0_1, 1_0, 1_1, or 2_3. In this case, in case that a base station is able to sufficiently control interference due to OOB emission, terminals configured with an XDD indicator may transmit an uplink data, control, random access channel, or SRS, even in a time domain symbol in which a synchronization signal block is transmitted by the base station, thereby enhancing uplink coverage.

Figure 11:
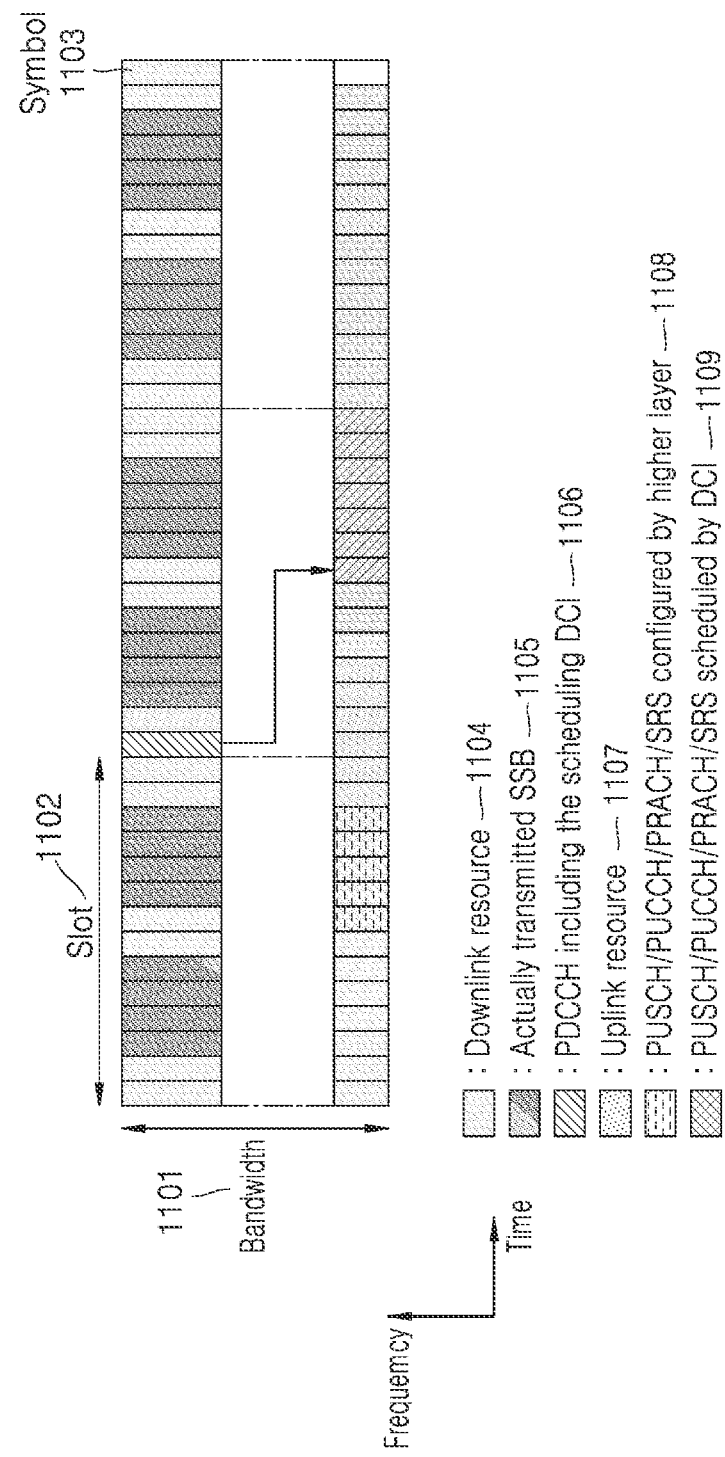
FIG. 11 is a diagram illustrating an example of a configured frame structure of a terminal in an XDD system, according to an embodiment of the disclosure.

FIG. 11 is a diagram illustrating an example of a configured frame structure of a terminal in an XDD system, according to an embodiment of the disclosure.

Referring to FIG. 11, a terminal may be aware of time domain symbol positions 1105 of a synchronization signal block, based on cell-specific configuration information through received SIB information or higher layer signaling. The terminal may be configured with an uplink data, control, random access channel, or SRS 1108 through higher layer signaling. An uplink data, control, random access channel, or SRS 1109 may be scheduled in the terminal through downlink control information format 0_0, 0_1, 1_0, 1_1, or 2_3.

Figure 12:
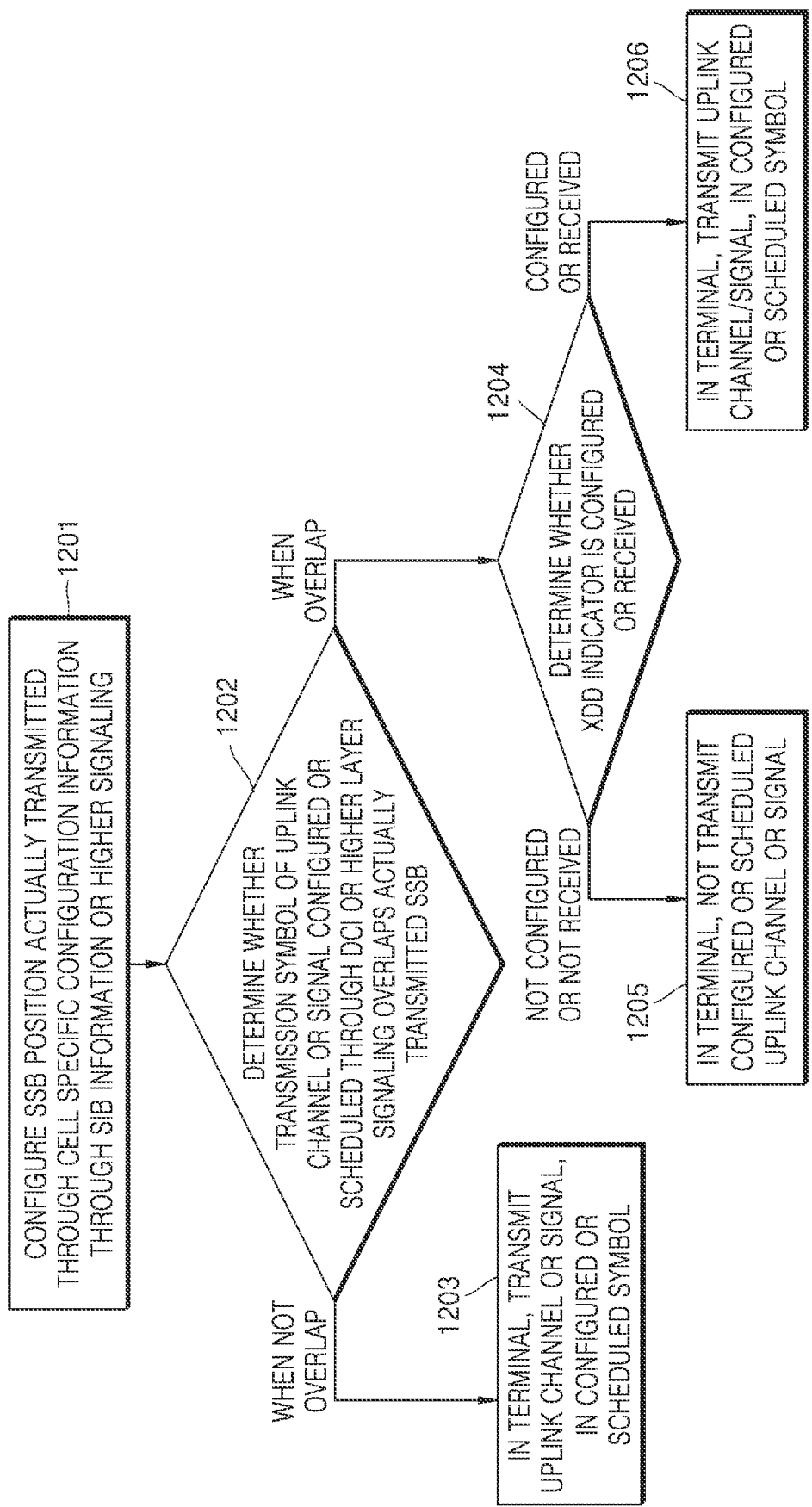
FIG. 12 is a diagram illustrating a method by which a terminal determines whether to transmit an uplink channel and signal, according to an embodiment of the disclosure.

FIG. 12 is a diagram illustrating a method by which a terminal determines whether to transmit an uplink channel and signal, according to an embodiment of the disclosure.

Referring to FIG. 12, a terminal may be aware of time domain symbol positions 1105 of a synchronization signal block actually transmitted by a base station, based on cell-specific configuration information through received SIB information or higher layer signaling (operation 1201). The terminal may determine whether a transmission symbol of an uplink data, control, random access channel, or SRS 1108/1109, configured or scheduled through higher layer signaling or downlink control information (DCI) format 0_0, 0_1, 1_0, 1_1, or 2_3 overlaps based on a time domain (operation 1202).

In an embodiment, in case that the transmission symbol of the configured or scheduled uplink data, control, random access channel, or SRS 1108/1109 does not overlap based on the time domain, the terminal may transmit the uplink channel or signal 1108/1109 in the configured or scheduled symbol (operation 1203). In an embodiment, in case that the transmission symbol overlaps based on the time domain, the terminal may determine whether an XDD system indicator (or priority rule change indicator, described in Fourth Embodiment) is configured or received (operation 1204).

In an embodiment, when the terminal is not configured with or does not receive the XDD system indicator, the terminal may not transmit the uplink data, control, random access channel, or SRS scheduled through higher layer signaling or DCI format 0_0, 0_1, 1_0, 1_1, or 2_3 in the time domain symbol in which the synchronization signal block is transmitted (operation 1205).

In an embodiment, when the terminal is configured with or receives the XDD system indicator, the terminal may transmit the uplink channel and signal 1108/1109 configured or scheduled through higher layer signaling or DCI 1106 (operation 1206). Not all operations described inn FIG. 12 should be performed according to the described order, and the order in which each operation is performed may be changed or omitted.

Method 2

When a terminal is configured with an XDD indicator (defined in Fourth Embodiment), the terminal may not transmit an uplink data channel, control channel, random access channel, and SRS through higher layer signaling, but may transmit an uplink data, control, random access channel, or SRS scheduled through DCI format 0_0, 0_1, 1_0, 1_1, or 2_3, at a time domain position where a synchronization signal block is transmitted. As described above, from the viewpoint of a base station, in case that synchronization signal block transmission and uplink channel/signal reception are performed in the same symbol, there may be an interference effect on the base station due to OOB emission by the synchronization signal block transmission. Also, from the viewpoint of a terminal, a terminal transmitting an uplink channel/signal may have an interference effect due to OOB emission on a terminal receiving a synchronization signal block in the vicinity. Accordingly, transmitting an uplink channel/signal in a time domain symbol in which a synchronization signal block is transmitted should be controlled in real time in order to avoid an interference effect as much as possible. In this case, because an uplink data channel, control channel, random access channel, and SRS configured through higher layer signaling are pre-configured information, unlike in scheduling through DCI (L1 signaling), it may be difficult to control the uplink data channel, control channel, random access channel, and SRS in real time.

Accordingly, terminals configured with an XDD indicator may transmit an uplink data, control, random access channel, or SRS, scheduled through DCI which may control an interference effect due to OOB emission in real time, even in a time domain symbol in which a synchronization signal block is transmitted by a base station, thereby enhancing uplink coverage.

Figure 13:
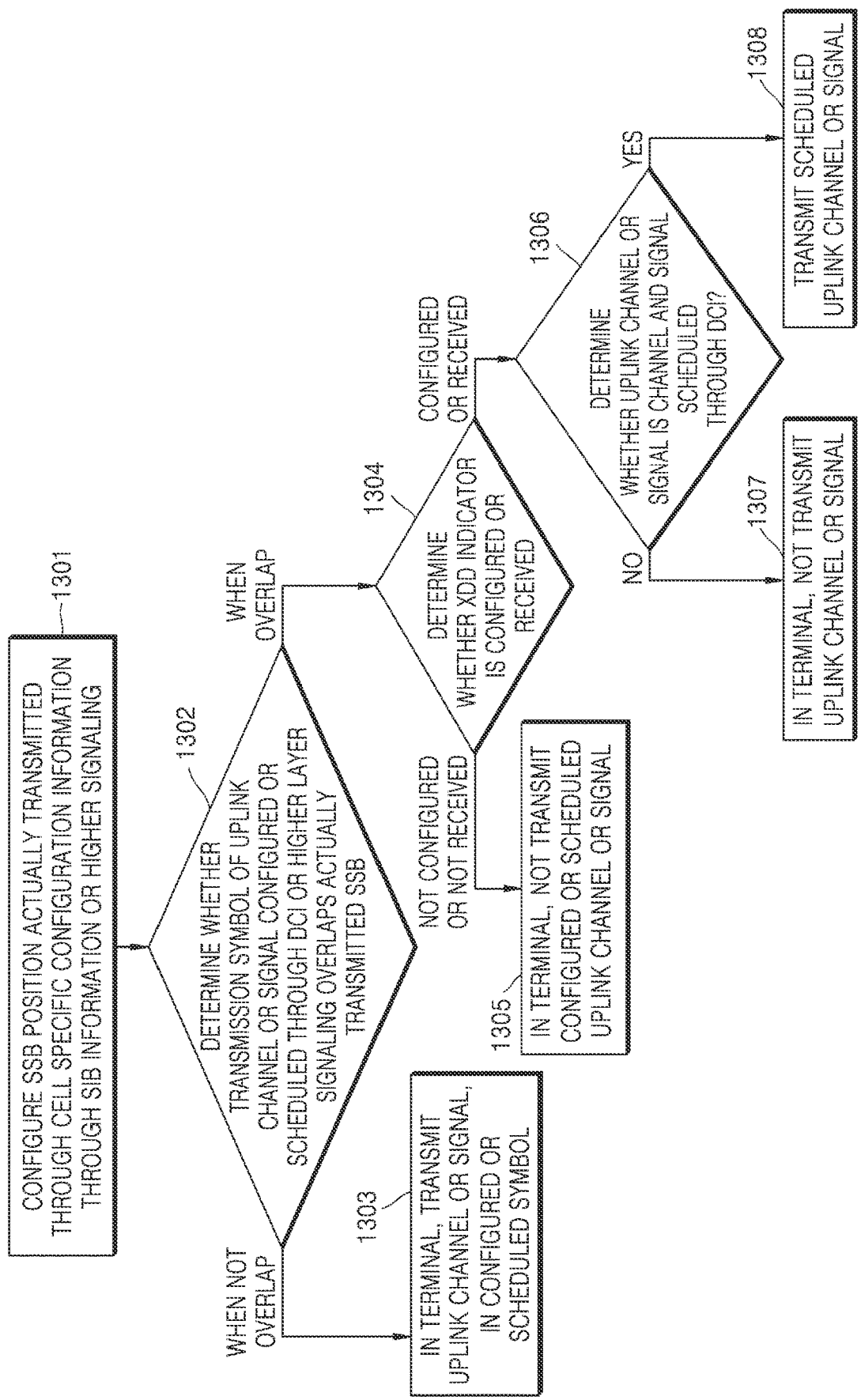
FIG. 13 is a diagram illustrating another method by which a terminal determines whether to transmit an uplink channel and signal, according to an embodiment of the disclosure.

FIG. 13 is a diagram illustrating another method by which a terminal determines whether to transmit an uplink channel and signal, according to an embodiment of the disclosure.

Referring to FIG. 13, a terminal may be aware of time domain symbol positions 1105 of a synchronization signal block actually transmitted by a base station based on cell-specific configuration information through received SIB information or higher layer signaling (operation 1301). The terminal may determine whether a transmission symbol of an uplink data, control, random access channel, or SRS 1108/1109 configured or scheduled through higher layer signaling or DCI format 0_0, 0_1, 1_0, 1_1, or 2_3 overlaps based on a time domain (operation 1302).

In an embodiment, in case that the transmission symbol of the configured or scheduled uplink data, control, random access channel, or SRS 1108/1109 does not overlap based on the time domain, the terminal may transmit the uplink channel or signal 1108/1109, in the configured or scheduled symbol (operation 1303). In an embodiment, in case that the transmission symbol overlaps based on the time domain, the terminal may determine whether an XDD system indicator (or priority rule change indicator, described in Fourth Embodiment) is configured or received (operation 1304).

In an embodiment, when the terminal is not configured with or does not receive the XDD system indicator, the terminal may not transmit the uplink data, control, random access channel, or SRS scheduled through higher layer signaling or DCI format 0_0, 0_1, 1_0, 1_1, or 2_3 in the time domain symbol in which the synchronization signal block is transmitted (operation 1305).

In an embodiment, when the terminal is configured with or receives the XDD system indicator, the terminal may determine whether the uplink channel signal is the uplink channel and signal 1109 scheduled through DCI format 0_0, 0_1, 1_0, 1_1, or 2_3 (operation 1306). When it is not the uplink channel and signal scheduled through DCI 1106, the terminal may not transmit the uplink channel and signal 1108 (operation 1307). When the uplink channel and signal is scheduled through the DCI 1106, the terminal may transmit the uplink channel and signal 1109 (operation 1308). Not all operations described in FIG. 13 should be performed in the described order, and the order in which each operation is performed may be changed or omitted.

Method 3

When a terminal is configured with an XDD indicator (defined in Fourth Embodiment), the terminal may not transmit an uplink control channel, random access channel, and SRS, but may transmit an uplink data channel, at a time domain position where a synchronization signal block is transmitted.

As described above, from the viewpoint of a base station, in case that synchronization signal block transmission and uplink channel/signal reception are performed in the same symbol, there may be an interference effect on the base station due to OOB emission by the synchronization signal block transmission. Also, from the viewpoint of a terminal, a terminal transmitting an uplink channel/signal may have an interference effect due to OOB emission on a terminal receiving a synchronization signal block in the vicinity. In order to minimize an interference effect, a terminal may transmit an uplink channel/signal having a high priority in the same symbol as that for synchronization signal block transmission of a base station. In this case, from the viewpoint of coverage extension between the base station and the terminal, a channel having a highest priority may be an uplink data channel.

According to an embodiment, because an uplink data channel has smallest coverage from among uplink/downlink channels and signals, overall coverage between a base station and a terminal may be determined by the uplink data channel. Accordingly, terminals configured with an XDD indicator may transmit an uplink data channel having a highest priority even in a time domain symbol in which a base station transmits a synchronization signal block, thereby extending coverage.

Figure 14:
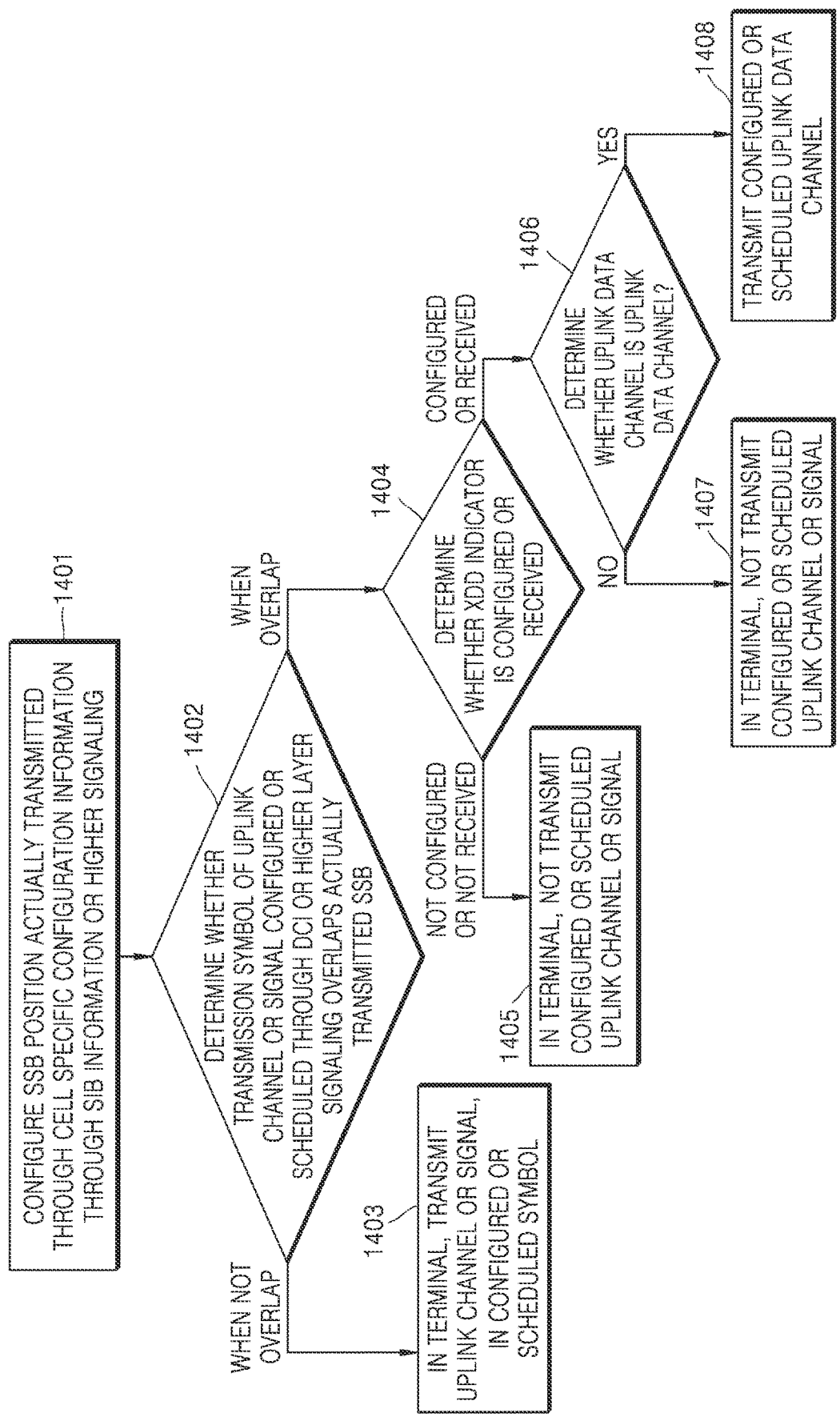
FIG. 14 is a diagram illustrating another method by which a terminal determines whether to transmit an uplink channel and signal, according to an embodiment of the disclosure.

FIG. 14 is a diagram illustrating another method by which a terminal determines whether to transmit an uplink channel and signal, according to an embodiment of the disclosure.

Referring to FIG. 14, a terminal may be aware of time domain symbol positions 1105 of a synchronization signal block actually transmitted by a base station based on cell-specific configuration information through received SIB information or higher layer signaling (operation 1401). The terminal may determine whether a transmission symbol of an uplink data, control, random access channel, or SRS 1108/1109 configured or scheduled through higher layer signaling or DCI format 0_0, 0_1, 1_0, 1_1, or 2_3 overlaps based on a time domain (operation 1402).

In an embodiment, in case that the transmission symbol of the configured or scheduled uplink data, control, random access channel, or SRS 1108/1109 does not overlap based on the time domain, the terminal may transmit the uplink channel or signal 1108/1109, in the configured or scheduled symbol (operation 1403). In an embodiment, in case that the transmission symbol overlaps based on the time domain, the terminal may determine whether an XDD system indicator (or priority rule change indicator, described in Fourth Embodiment) is configured or received (operation 1404).

In an embodiment, when the terminal is not configured with or does not receive the XDD system indicator, the terminal may not transmit the uplink data, control, random access channel, or SRS scheduled through higher layer signaling or DCI format 0_0, 0_1, 1_0, 1_1, or 2_3, in the time domain symbol in which the synchronization signal block is transmitted (operation 1405).

In an embodiment, when the terminal is configured with or receives the XDD system indicator, the terminal may determine whether the uplink data channel is the uplink data channel 1109 configured through higher layer signaling or scheduled through DCI (operation 1406). When the uplink data channel is not the uplink data channel 1109, the terminal may not transmit the uplink channel in the symbol in which the synchronization signal block is actually transmitted (operation 1407). When it is determined that the uplink data channel is the uplink data channel 1109, the terminal may transmit the uplink data channel in the symbol in which the synchronization signal block is actually transmitted (operation 1408). Not all operations described in FIG. 14 should be performed in the described order, and the order in which each operation is performed may be changed or omitted.

In the above method, a method of determining and transmitting an uplink channel or signal at a time domain position where a synchronization signal block is transmitted when an XDD indicator (defined in Fourth Embodiment) is configured is not limited to a data channel, and may also be applied to other uplink channel or signals such as a control channel, random access channel, and SRS.

Method 4

When a terminal is configured with an XDD indicator (defined in Fourth Embodiment), the terminal may transmit an uplink data channel, control channel, random access channel, and SRS when a different additional condition for each channel is satisfied at a time domain position where a synchronization signal block is transmitted.

As described above, from the viewpoint of a base station, in case that synchronization signal block transmission and uplink channel/signal reception are performed in the same symbol, there may be an interference effect on a base station due to OOB emission by the synchronization signal block transmission. Also, from the viewpoint of a terminal, a terminal transmitting an uplink channel/signal may have an interference effect due to OOB emission on a terminal receiving a synchronization signal block in the vicinity. In order to minimize an interference effect, when a base station performs scheduling along with a coverage-related configuration on a terminal in a situation where coverage of the base station and the terminal is poor, the terminal may transmit an uplink channel or signal at a time domain position where a synchronization signal block is transmitted. The coverage-related configuration may include at least one of the following configurations.

Specific number of repetition times of a data channel or more

Pi/2-BPSK modulation

DFT-s-OFDM transmission method

Specific aggregation level of a downlink control channel for scheduling an uplink channel or signal or more New radio network temporary identifier (RNTI) of DCI for scheduling an uplink channel or signal Frequency hopping Specific uplink control channel format Specific TPC command Specific MCS index or less Specific PRACH configuration index A terminal may determine whether to transmit an uplink channel or signal at a time domain position which a synchronization signal block is transmitted, based on a coverage-related configuration. The coverage-related configuration may vary according to each uplink channel or signal. Accordingly, terminals configured with an XDD indicator may transmit an uplink channel or signal even in a time domain symbol in which a base station transmits a synchronization signal block when a coverage-related configuration is scheduled, thereby extending coverage.

Figure 15:
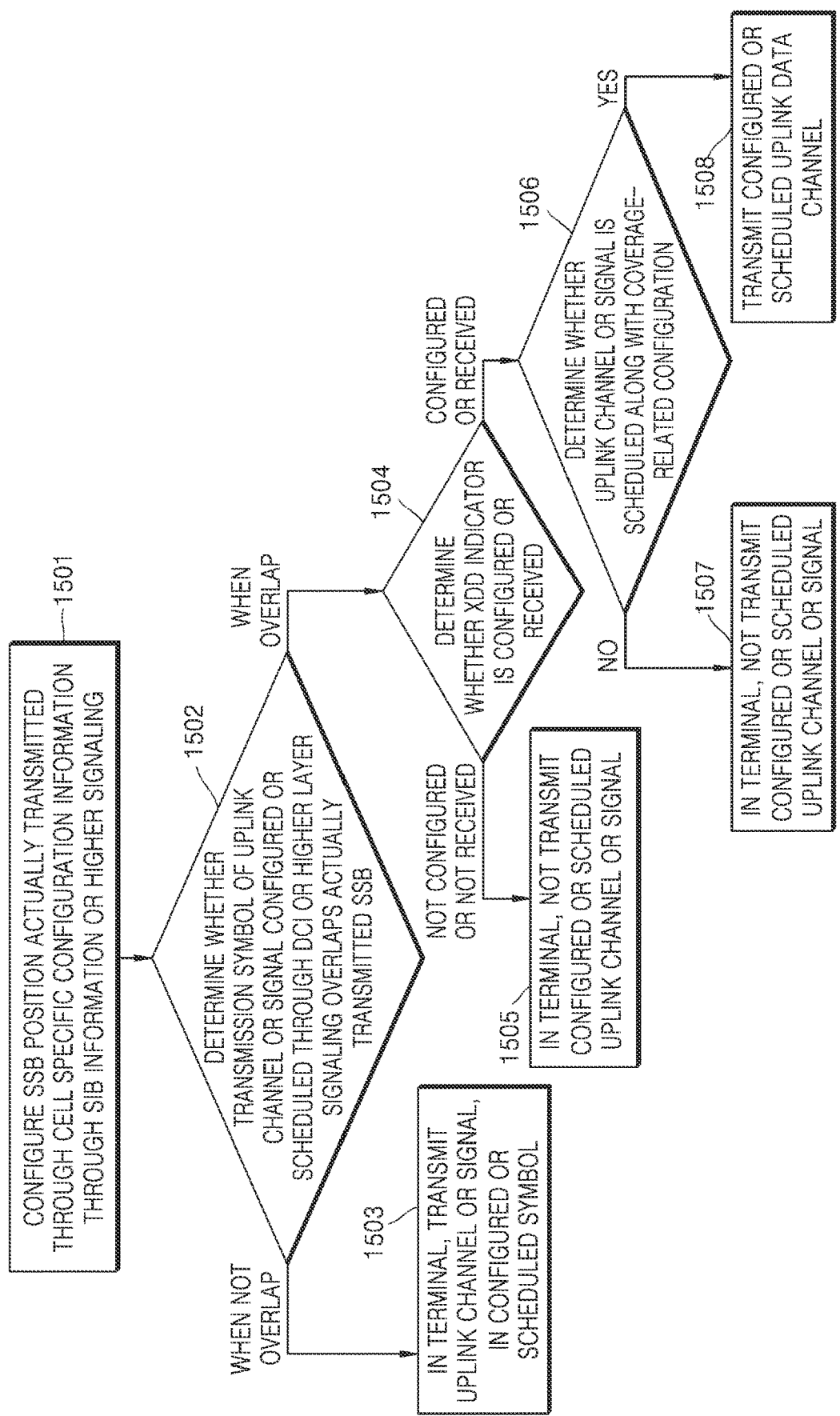
FIG. 15 is a diagram illustrating another method by which a terminal determines whether to transmit an uplink channel and signal, according to an embodiment of the disclosure.

FIG. 15 is a diagram illustrating another method by which a terminal determines whether to transmit an uplink channel and signal, according to an embodiment of the disclosure.

Referring to FIG. 15, a terminal may be aware of time domain symbol positions 1105 of a synchronization signal block actually transmitted by a base station based on cell-specific configuration information through received SIB information or higher layer signaling (operation 1501). The terminal may determine whether a transmission symbol of an uplink data, control, random access channel, or SRS 1108/1109 configured or scheduled through higher layer signaling or DCI format 0_0, 0_1, 1_0, 1_1, or 2_3 overlaps based on a time domain (operation 1502).

In an embodiment, in case that the transmission symbol of the configured or scheduled uplink data, control, random access channel, or SRS 1108/1109 does not overlap based on the time domain, the terminal may transmit the uplink channel or signal 1108/1109, in the configured or scheduled symbol (operation 1503). In an embodiment, in case that the transmission symbol overlaps based on the time domain, the terminal may determine whether an XDD system indicator (or priority rule change indicator, described in Fourth Embodiment) is configured or received (operation 1504).

In an embodiment, when the terminal is not configured with or does not receive an XDD system indicator, the terminal may not transmit the uplink data, control, random access channel, or SRS scheduled through higher layer signaling or DCI format 0_0, 0_1, 1_0, 1_1, or 2_3, in the time domain symbol in which the synchronization signal block is transmitted (operation 1505).

In an embodiment, when the terminal is configured with or receives the XDD system indicator, the terminal may determine whether an uplink channel or signal is scheduled through higher layer signaling or DCI along with a coverage-related configuration (operation 1506). In an embodiment, when the terminal does not receive the coverage-related configuration, the terminal may not transmit the uplink channel/signal in the symbol in which the synchronization signal block is actually transmitted (operation 1507). In an embodiment, when the terminal receives the coverage-related configuration, the terminal may transmit the scheduled uplink channel/signal, in the symbol in which the synchronization signal block is actually transmitted (operation 1508). Not all operations described in FIG. 15 should be performed in the described order, and the order in which each operation is performed may be changed or omitted.

Second Embodiment

Second Embodiment of the disclosure relates to a method by which a terminal receives a downlink channel or signal in case that a valid random access channel transmission time (valid PRACH occasion) is configured in an XDD system. Through a downlink channel or signal receiving method of the present embodiment, in case that a base station transmits an indicator (an indicator transmitting method and an operation using an indicator are described in Fourth Embodiment) to a terminal, a time domain resource in which the terminal may receive downlink may be increased, thereby enhancing downlink coverage between the terminal and the base station.

In detail, as described above, a time domain position of a PRACH occasion may be configured through a PRACH configuration index included in SIB or higher layer signaling. In this case, because terminals for initial access may transmit a random access preamble at a PRACH occasion, in a TDD system in which uplink and downlink resources are basically allocated through a time domain, a downlink channel and signal of a terminal may not be received in the same symbol(s). In this case, as described above, when there are more downlink resources than uplink resources, a short PRACH occasion may be allocated in the time domain, and an uplink coverage problem for initial access of the terminal may occur.

In order to solve this problem, as described above, in an XDD system, uplink and downlink resources may be divided and allocated not only in a time domain but also in a frequency domain. Hence, a time at which a terminal may transmit a random access channel may be increased even in a time domain, and at the time, a base station may transmit a downlink channel and signal. However, as described above, in the XDD system, when compared to an FDD system, because uplink and downlink resources are relatively close in a frequency band, interference due to OOB emission may occur. In the present embodiment, a channel or signal transmitted as downlink to a terminal by a base station may interfere with random access preamble reception transmitted by a terminal for initial access. Also, the random access preamble transmitted by the terminal for initial access may interfere with the terminal that is to receive downlink transmitted by the base station.

Accordingly, the disclosure provides a method by which, in case that a valid PRACH occasion is configured in an XDD system, a terminal determines whether to receive a downlink channel or signal in the same symbol(s)/slot(s).

The following methods may be considered as a method by which a terminal determines whether to receive a downlink channel and signal in an XDD system.

Method 1

When a terminal is configured with an XDD indicator (defined in Fourth Embodiment), the terminal may receive a synchronization signal block, downlink data channel, control channel, and reference signal through higher layer signaling and a downlink data channel, control channel, and reference signal scheduled through DCI format 1_0, 1_1, or 0_1, in symbol(s)/slot(s) in which a valid PRACH occasion is configured. In this case, when a base station is able to sufficiently control an interference effect due to OOB emission, terminals configured with an XDD indicator may receive a synchronization signal block, downlink data channel, control channel, or reference signal even in a valid PRACH occasion symbol, thereby extending downlink coverage, and the valid PRACH occasion may be configured without limitations of downlink. Accordingly, random access coverage may be extended.

Figure 16:
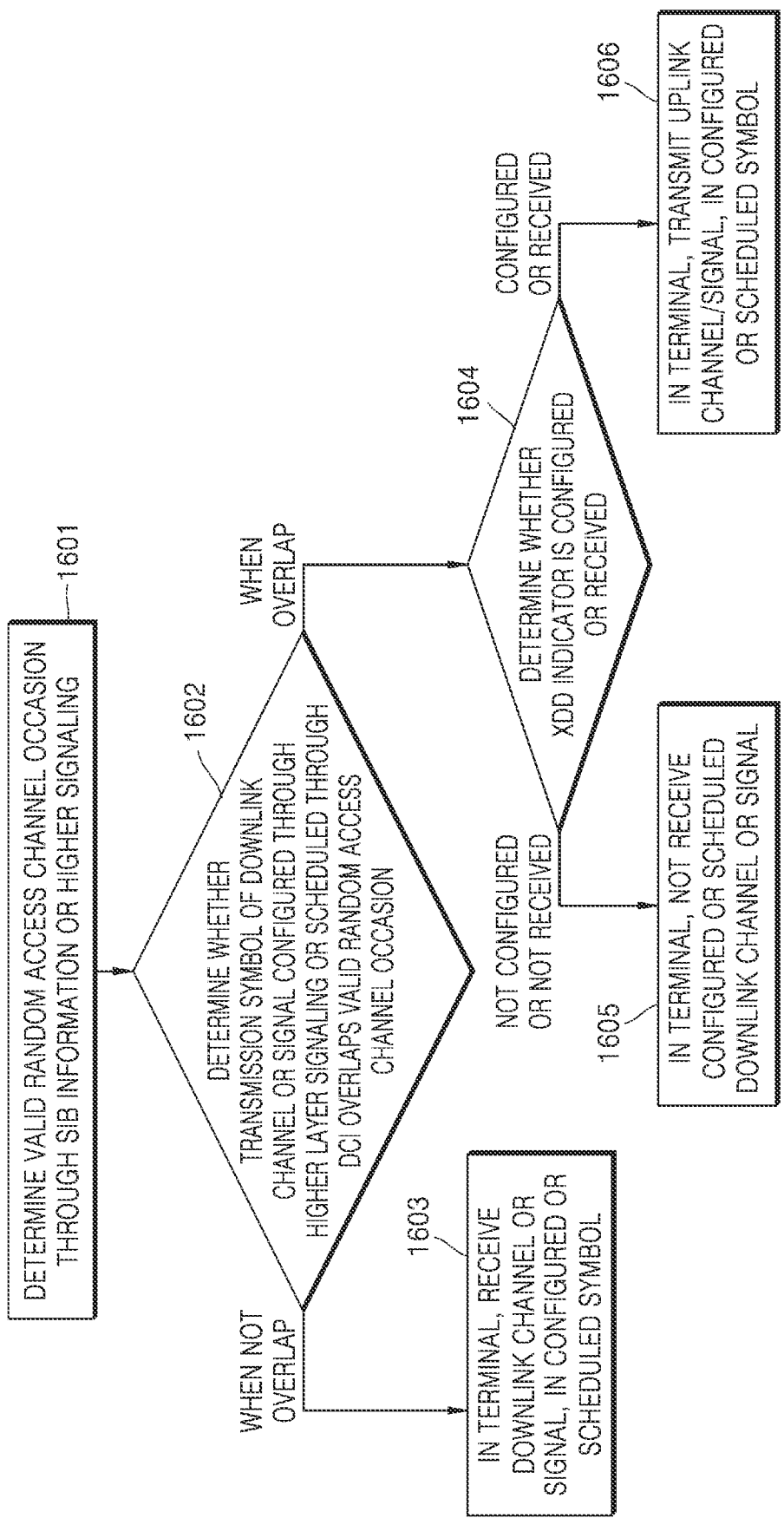
FIG. 16 is a diagram illustrating a method by which a terminal determines whether to receive a downlink channel and signal, according to an embodiment of the disclosure.

FIG. 16 is a diagram illustrating a method by which a terminal determines whether to receive a downlink channel and signal, according to an embodiment of the disclosure.

Referring to FIG. 16, a terminal may be aware of positions of symbol(s)/slot(s) in which a valid PRACH occasion is configured based on cell-specific configuration information through received SIB information or higher layer signaling (operation 1601). The terminal may determine whether a reception symbol of a synchronization signal block, downlink data channel, control channel, or reference signal configured or scheduled through higher layer signaling or DCI format 1_0, 1_1, or 0_1 overlaps based on a time domain (operation 1602).

In an embodiment, in case that the reception symbol of the configured or scheduled synchronization signal block, downlink data channel, control channel, or reference signal does not overlap based on the time domain, the terminal may receive the downlink channel or signal, in the configured or scheduled symbol (operation 1603). In an embodiment, in case that the reception symbol overlaps based on the time domain, the terminal may determine whether an XDD system indicator (or priority rule change indicator, described in Fourth Embodiment) is configured or received (operation 1604).

In an embodiment, when the terminal is not configured with or does not receive an XDD system indicator, the terminal may not receive the synchronization signal block, downlink data channel, control channel, or reference signal scheduled through higher layer signaling or DCI format 1_0, 1_1, or 0_1 in the symbol(s)/slot(s) in which the valid PRACH occasion is configured (operation 1605).

In an embodiment, when the terminal is configured with or receives the XDD system indicator, the terminal may receive the downlink channel and signal in the symbol(s)/slot(s) configured or scheduled through higher layer signaling or DCI. Not all operations described in FIG. 16 should be performed in the described order, and the order in which each operation is performed may be changed or omitted.

Method 2

When a terminal is configured with an XDD indicator (defined in Fourth Embodiment), the terminal may not receive a synchronization signal block, downlink data channel, control channel, and reference signal through higher layer signaling, but may receive a downlink data channel, control channel, and reference signal scheduled through DCI format 1_0, 1_1, or 0_1, in symbol(s)/slot(s) in which a valid PRACH occasion is configured.

As described, from the viewpoint of a base station, in case that downlink channel/signal transmission and uplink random access channel reception are performed in the same symbol, there may be an interference effect on the base station due to OOB emission by the downlink channel/signal transmission. Also, from the viewpoint of a terminal, a terminal transmitting an uplink random access channel may have an interference effect due to OOB emission on a terminal receiving downlink in the vicinity. Accordingly, receiving a downlink channel/signal in a time domain symbol in which a random access channel may be received should be controlled in real time to avoid an interference effect as much as possible. In this case, because a synchronization signal block, downlink data channel, control channel, and reference signal configured through higher layer signaling are pre-configured information, unlike in scheduling through DCI (L1 signaling), it may be difficult to control the synchronization signal block, downlink data channel, control channel, and reference signal in real time.

Accordingly, terminals configured with an XDD indicator may receive a downlink data channel, control channel, or reference signal scheduled through DCI which may enable a base station to control an interference effect due to OOB emission in real time, even in a time domain symbol in which a random access channel may be transmitted, thereby enhancing uplink/downlink coverage.

Figure 17:
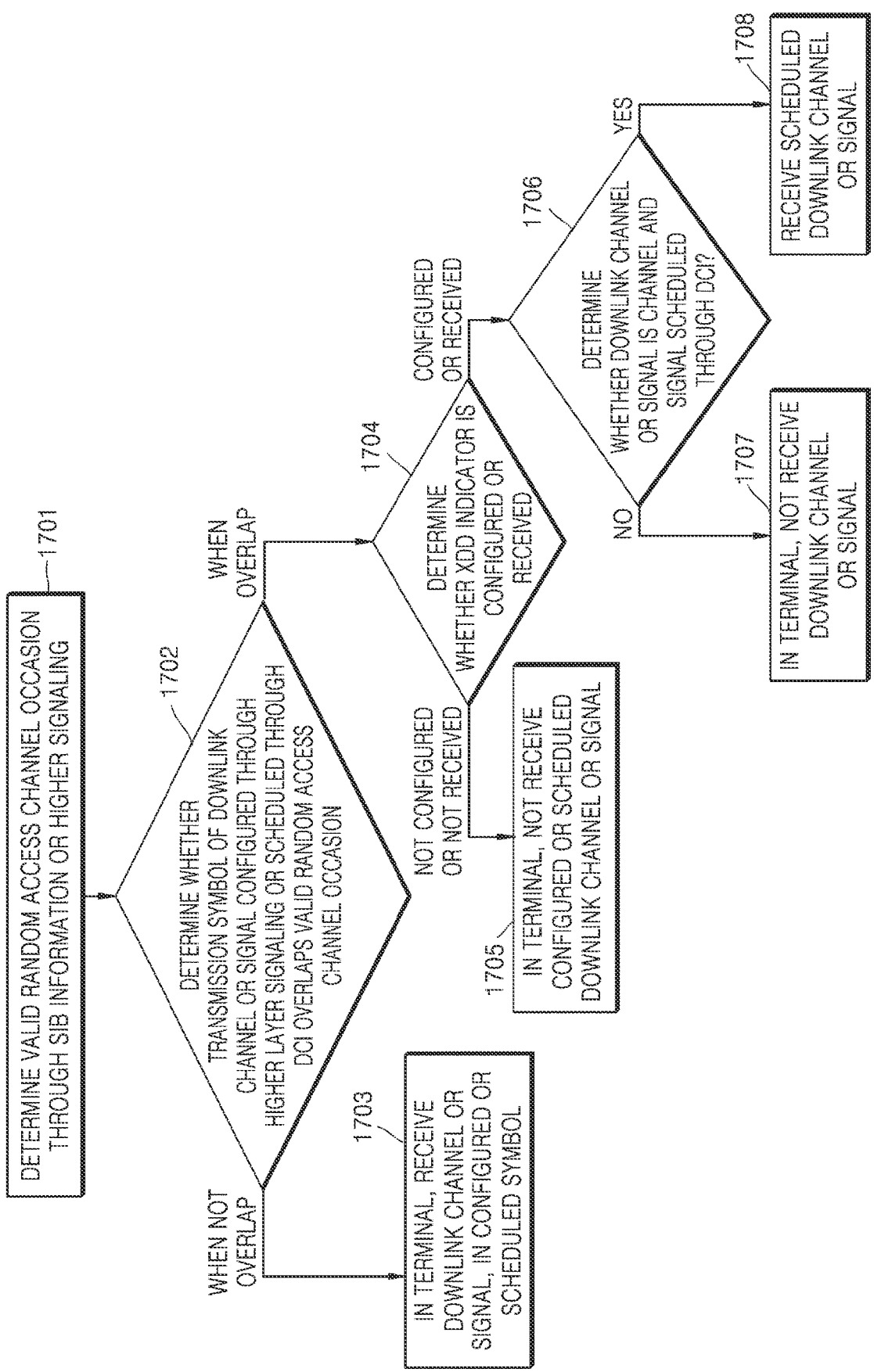
FIG. 17 is a diagram illustrating another method by which a terminal determines whether to receive a downlink channel and signal, according to an embodiment of the disclosure.

FIG. 17 is a diagram illustrating another method by which a terminal determines whether to receive a downlink channel and signal, according to an embodiment of the disclosure.

Referring to FIG. 17, a terminal may be aware of positions of symbol(s)/slot(s) in which a valid PRACH occasion is configured based on cell-specific configuration information through received SIB information or higher layer signaling (operation 1701). The terminal may determine whether a reception symbol of a synchronization signal block, downlink data channel, control channel, or reference signal configured or scheduled through higher layer signaling or DCI format 1_0, 1_1, or 0_1 overlaps based on a time domain (operation 1702).

In an embodiment, in case that the reception symbol of the configured or scheduled synchronization signal block, downlink data channel, control channel, or reference signal does not overlap based on the time domain, the terminal may receive the downlink channel or signal, in the configured or scheduled symbol (operation 1703). In an embodiment, in case that the reception symbol overlaps based on the time domain, the terminal may determine whether an XDD system indicator (or priority rule change indicator, described in Fourth Embodiment) is configured or received (operation 1704).

In an embodiment, when the terminal is not configured with or does not receive an XDD system indicator, the terminal may not receive the synchronization signal block, downlink data channel, control channel, or reference signal scheduled through higher layer signaling or DCI format 1_0, 1_1, or 0_1 in the symbol(s)/slot(s) in which the valid PRACH occasion is configured (operation 1705).

In an embodiment, when the terminal is configured with or receives the XDD system indicator, the terminal may determine whether the downlink channel or signal is a downlink channel and signal scheduled through DCI format 1_0, 1_1, or 0_1 (operation 1706). In an embodiment, when the downlink channel or signal is not the downlink channel and signal scheduled through DCI, the terminal may not receive the downlink channel and signal (operation 1707). In an embodiment, when the downlink channel or signal is scheduled through DCI, the terminal may receive the downlink channel and signal (operation 1708). Not all operations described in FIG. 17 should be performed in the described order, and the order in which each operation is performed may be changed or omitted.

Method 3

When a terminal is configured with an XDD indicator (defined in Fourth Embodiment), the terminal may not receive a downlink data channel, control channel, and reference signal, but may receive a synchronization signal block, in symbol(s)/slot(s) in which a valid PRACH occasion is configured.

As described above, from the viewpoint of a base station, in case that downlink channel/signal transmission and uplink random access channel reception are performed in the same symbol, there may be an interference effect on the base station due to OOB emission by the downlink channel/signal transmission. Also, from the viewpoint of a terminal, a terminal transmitting an uplink random access channel may have an interference effect due to OOB emission on a terminal receiving downlink in the vicinity. In order to minimize an interference effect, a terminal may receive a downlink channel/signal having a high priority in a symbol in which an uplink random access channel may be transmitted. In this case, a channel having a highest priority may be a synchronization signal block. Accordingly, terminals configured with an XDD indicator may receive a synchronization signal block having a highest priority, even in a time domain symbol in which a random access channel may be transmitted, thereby extending coverage.

Figure 18:
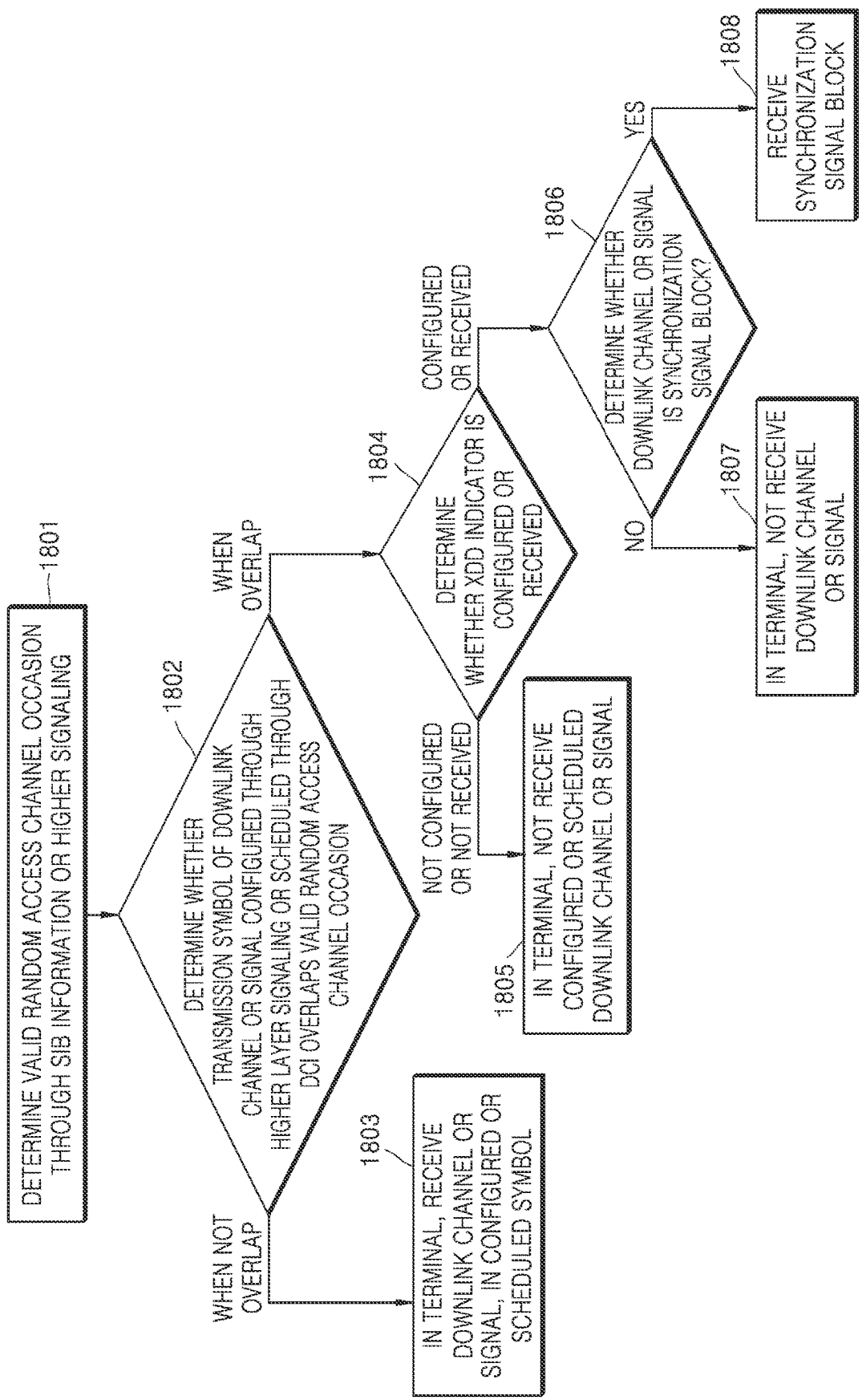
FIG. 18 is a diagram illustrating another method by which a terminal determines whether to receive a downlink channel and signal, according to an embodiment of the disclosure.

FIG. 18 is a diagram illustrating another method by which a terminal determines whether to receive a downlink channel and signal, according to an embodiment of the disclosure.

Referring to FIG. 18, a terminal may be aware of positions of symbol(s)/slot(s) in which a valid PRACH occasion is configured based on cell-specific configuration information through received SIB information or higher layer signaling (operation 1801). The terminal may determine whether a reception symbol of a synchronization signal block, downlink data channel, control channel or reference signal configured or scheduled through higher layer signaling or DCI format 1_0, 1_1, or 0_1 overlaps based on a time domain (operation 1802).

In an embodiment, in case that the reception symbol of the configured or scheduled synchronization signal block, downlink data channel, control channel, or reference signal does not overlap based on the time domain, the terminal may receive the downlink channel or signal in the configured or scheduled symbol (operation 1803). In an embodiment, in case that the reception symbol overlaps based on the time domain, the terminal may determine whether an XDD system indicator (or priority rule change indicator, described in Fourth Embodiment) is configured or received (operation 1804).

In an embodiment, when the terminal is not configured with or does not receive an XDD system indicator, the terminal may not receive the synchronization signal block, downlink data channel, control channel, or reference signal scheduled through higher layer signaling or DCI format 1_0, 1_1, or 0_1 in the symbol(s)/slot(s) in which the valid PRACH occasion is configured (operation 1805).

In an embodiment, when the terminal is configured with or receives the XDD system indicator, the terminal may determine whether the downlink channel or signal is an actual synchronization signal block configured through higher layer signaling (operation 1806). In an embodiment, when the downlink channel or signal is not the synchronization signal block configured through higher layer signaling, the terminal may not receive the synchronization signal block in the symbol(s)/slot(s) in which the valid PRACH occasion is configured (operation 1807). In an embodiment, when it is determined that the downlink channel or signal is the synchronization signal block, the terminal may receive the synchronization signal block in the symbol(s)/slot(s) in which the valid PRACH occasion is configured (operation 1808). Not all operations described in FIG. 18 should be performed in the described order, and the order in which each operation is performed may be changed or omitted.

In the above method, a method of determining and receiving a downlink channel or signal at a time domain position of a valid PRACH occasion when an XDD indicator (defined in Fourth Embodiment) is configured is not limited to a synchronization signal block, and may also be applied to other downlink channels or signals such as a downlink data channel, control channel, and reference signal.

Third Embodiment

Third Embodiment of the disclosure relates to a method by which a terminal transmits an uplink channel/signal in case that uplink-downlink configuration information of a slot/symbol format is semipermanently indicated stepwise and configured as downlink through cell-specific configuration information through system information and user-specific configuration information through higher layer signaling. Through an uplink channel or signal transmitting method of the present embodiment, in case that a base station transmits an indicator (an indicator transmitting method and an operation using an indicator are described in Fourth Embodiment) to a terminal, a time domain resource in which the terminal may transmit uplink may be increased, thereby enhancing uplink coverage between the terminal and the base station.

The present embodiment is not limited to a method in case that uplink-downlink configuration information is semipermanently indicated stepwise and configured as downlink through cell-specific configuration information through system information and user-specific configuration information through dedicated higher layer signaling, and may also be applied to a method by which a terminal receives a downlink channel/signal in case that uplink-downlink configuration information is configured as uplink.

In detail, as described above, uplink-downlink configuration information may be semipermanently indicated stepwise through cell-specific configuration information through system information and user-specific configuration information through dedicated higher layer signaling. In this case, a symbol/slot configured as downlink is a format pre-configured in a terminal, and thus, the terminal may not transmit a channel and signal of the link. Accordingly, a terminal and a base station do not consider an operation of another link in a symbol/slot in which uplink-downlink configuration information is pre-configured, thereby reducing complexity. However, in case that a terminal supporting TDD and a terminal supporting XDD coexist, for complexity of the TDD terminal and a base station, it may be advantageous to pre-configure uplink-downlink configuration information, but for coverage extension for the XDD terminal, another operation for increasing a time domain resource of uplink in this configuration may be required.

Accordingly, the present embodiment provides a method by which a terminal transmits an uplink channel/signal, in case that uplink-downlink configuration information is semipermanently indicated stepwise and configured as downlink through cell-specific configuration information through system information and user-specific configuration information through dedicated higher layer signaling in an XDD system.

The following methods may be considered as a method by which a terminal determines whether to transmit an uplink channel and signal in an XDD system.

Method 1

When a terminal is configured with an XDD indicator (defined in Fourth Embodiment), the terminal may transmit an uplink data channel, control channel, random access channel, and SRS through higher layer signaling and an uplink data, control, random access channel, or SRS scheduled through DCI format 0_0, 0_1, 1_0, 1_1, or 2_3 in a slot/symbol in which uplink downlink configuration information is configured as downlink. In this case, in case that a base station is able to sufficiently control an interference effect due to 00B emission, terminals configured with an XDD indicator may transmit an uplink data, control, random access channel, or SRS even in a time domain symbol in which the base station transmits a synchronization signal block, thereby enhancing uplink coverage.

Figure 19:
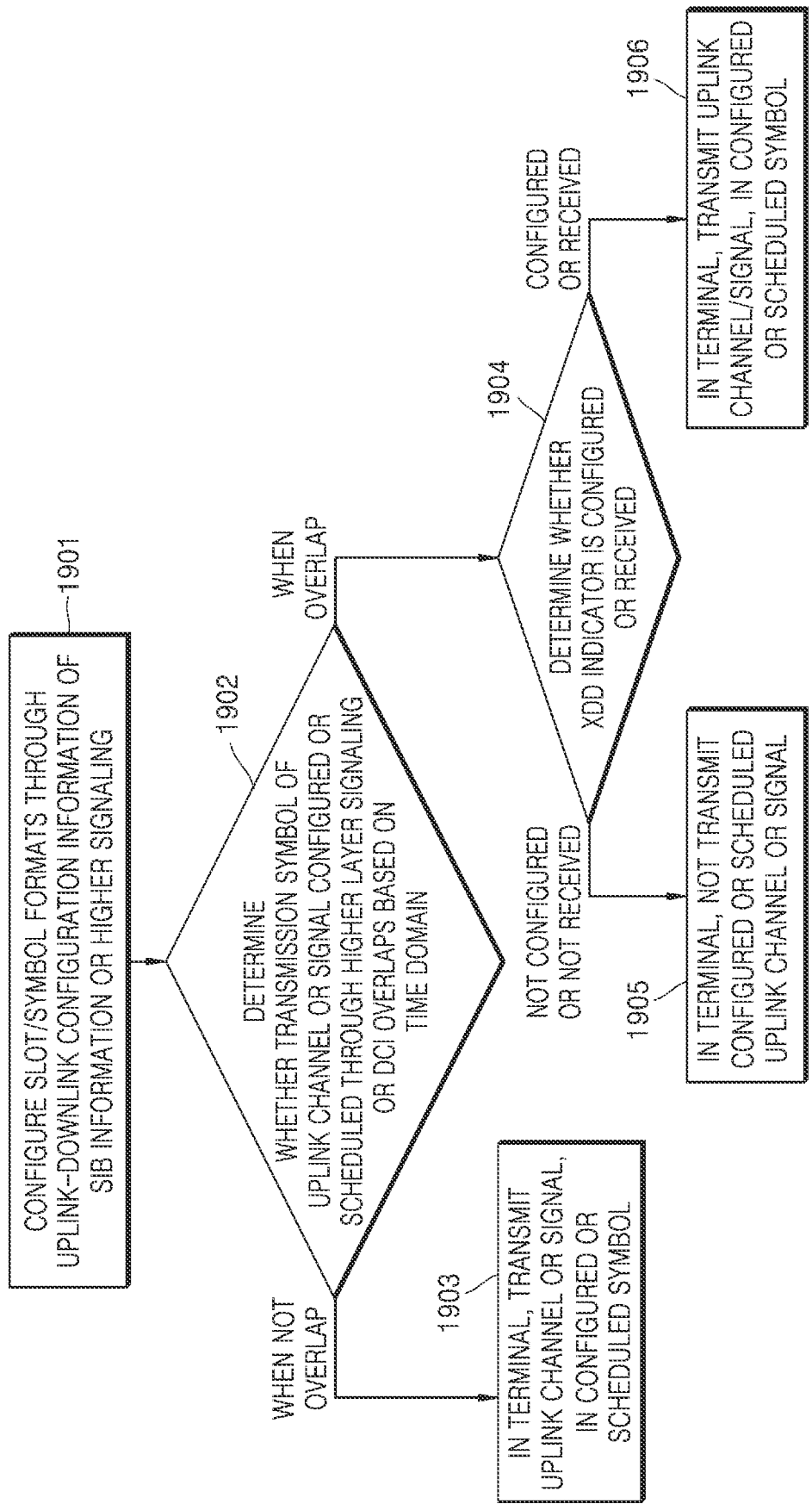
FIG. 19 is a diagram illustrating a method by which a terminal determines whether to transmit an uplink channel and signal, according to an embodiment of the disclosure.

FIG. 19 is a diagram illustrating a method by which a terminal determines whether to transmit an uplink channel and signal, according to an embodiment of the disclosure.

Referring to FIG. 19, a terminal may be aware of slots/symbols in which uplink-downlink configuration information is configured as downlink through received SIB information or higher layer signaling (operation 1901). The terminal may determine whether a transmission symbol of an uplink data, control, random access channel, or SRS 1108/1109 configured or scheduled through higher layer signaling or DCI format 0_0, 0_1, 1_0, 1_1, or 2_3 overlaps based on a time domain (operation 1902).

In an embodiment, in case that the transmission symbol of the configured or scheduled uplink data, control, random access channel, or SRS 1108/1109 does not overlap based on the time domain, the terminal may transmit the uplink channel or signal 1108/1109, in the configured or scheduled symbol (operation 1903). In an embodiment, in case that the transmission symbol overlaps based on the time domain, the terminal may determine whether an XDD system indicator (or priority rule change indicator, described in Fourth Embodiment) is configured or received (operation 1904).

In an embodiment, when the terminal is not configured with or does not receive an XDD system indicator, the terminal may not transmit the uplink data, control, random access channel, or SRS scheduled through higher layer signaling or DCI format 0_0, 0_1, 1_0, 1_1, or 2_3 in the time domain slot(s)/slot(s) in which the uplink-downlink configuration information is configured as downlink (operation 1905).

In an embodiment, when the terminal is configured with or receives the XDD system indicator, the terminal may transmit the uplink channel and signal 1108/1109 configured or scheduled through higher layer signaling or DCI 1106 (operation 1906). Not all operations described in FIG. 19 should be performed in the described order, and the order in which each operation is performed may be changed or omitted.

Method 2

When a terminal is configured with an XDD indicator (defined in Fourth Embodiment), the terminal may not transmit an uplink data channel, control channel, random access channel, and SRS through higher layer signaling, but may transmit an uplink data, control, random access channel, or SRS scheduled through DCI format 0_0, 0_1, 1_0, 1_1, or 2_3, in a slot/symbol in which uplink-downlink configuration information is configured as downlink. As described above, in case that uplink channel signal reception is performed in a slot/symbol in which uplink-downlink configuration information is configured as downlink, from the viewpoint of a terminal, a terminal receiving a downlink channel/signal may have an interference effect due to OOB emission on a terminal transmitting an uplink channel/signal in the vicinity. Accordingly, transmitting an uplink channel/signal in a slot/symbol in which uplink-downlink configuration information is configured as downlink should be controlled in real time to avoid an interference effect as much as possible. In this case, because an uplink data channel, control channel, random access channel, and SRS configured through higher layer signaling are pre-configured information, unlike in scheduling through downlink control information (L1 signaling), it may be difficult to control the uplink data channel, control channel, random access channel, and SRS in real time.

Accordingly, terminals configured with an XDD indicator may transmit an uplink data, control, random access channel, or SRS scheduled through DCI which may enable a base station to control an interference effect due to OOB emission in real time, even in a slot/symbol in which uplink downlink configuration information is configured as downlink, thereby enhancing uplink coverage.

Figure 20:
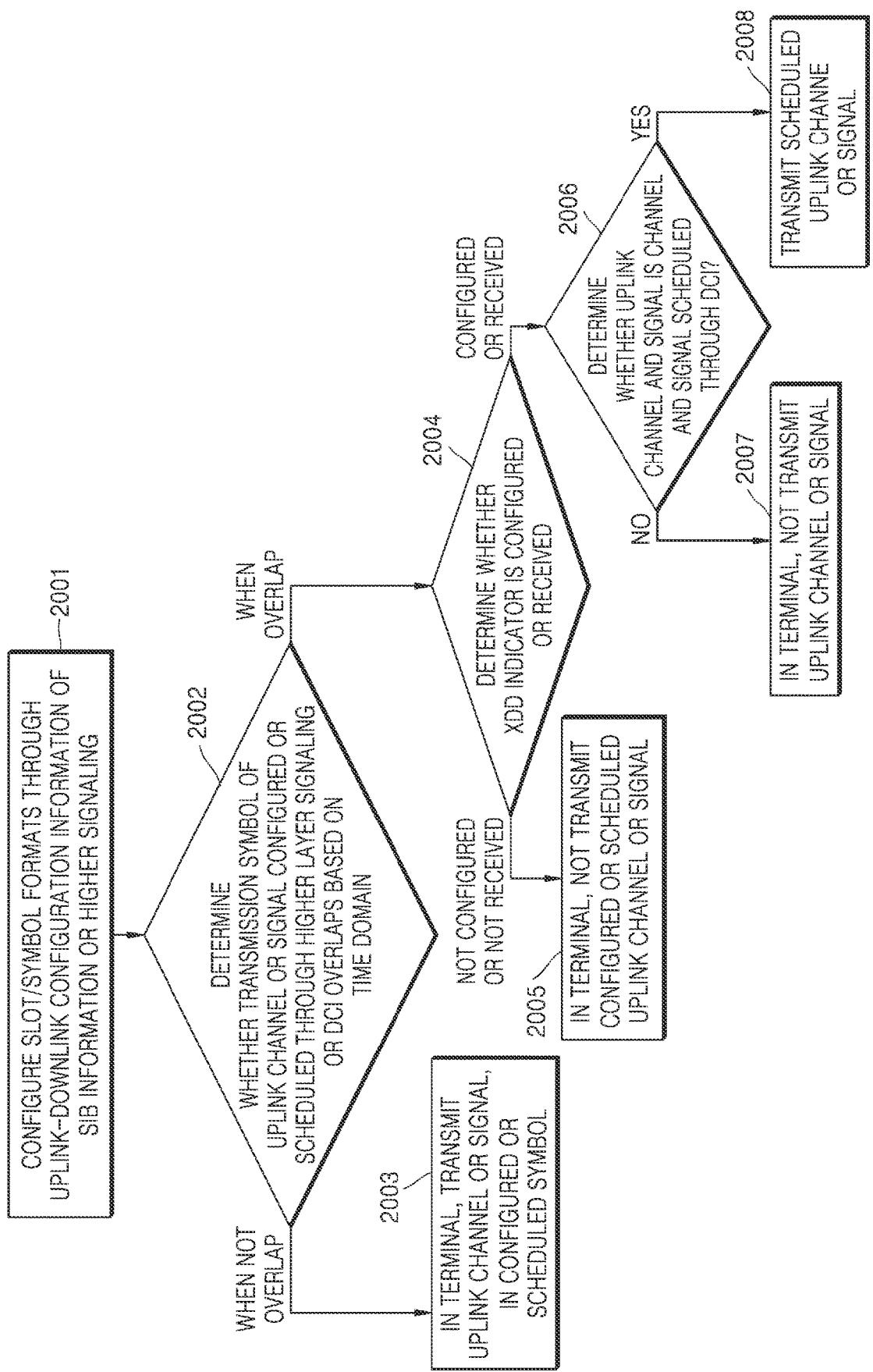
FIG. 20 is a diagram illustrating another method by which a terminal determines whether to transmit an uplink channel and signal, according to an embodiment of the disclosure.

FIG. 20 is a diagram illustrating another method by which a terminal determines whether to transmit an uplink channel and signal, according to an embodiment of the disclosure.

Referring to FIG. 20, a terminal may be aware of slots/symbols in which uplink-downlink configuration information is configured as downlink through received SIB information or higher layer signaling (operation 2001). The terminal may determine whether a transmission symbol of an uplink data, control, random access channel, or SRS 1108/1109 configured or scheduled through higher layer signaling or DCI format 0_0, 0_1, 1_0, 1_1, or 2_3 overlaps based on a time domain (operation 2002).

In an embodiment, in case that the transmission symbol of the configured or scheduled uplink data, control, random access channel, or SRS 1108/1109 does not overlap based on the time domain, the terminal may transmit the uplink channel or signal 1108/1109, in the configured or scheduled symbol (operation 2003). In an embodiment, in case that the transmission symbol overlaps based on the time domain, the terminal may determine whether an XDD system indicator (or priority rule change indicator, described in Fourth Embodiment) is configured or received (operation 2004).

In an embodiment, when the terminal is not configured with or does not receive an XDD system indicator, the terminal may not transmit the uplink data, control, random access channel, or SRS scheduled through higher layer signaling or DCI format 0_0, 0_1, 1_0, 1_1, or 2_3 in the time domain slot(s)/symbol(s) in which the uplink-downlink configuration information is configured as downlink (operation 2005).

In an embodiment, when the terminal is configured with or receives the XDD system indicator, the terminal may determine whether the uplink channel and signal is the uplink channel and signal 1109 scheduled through DCI 1106 format 0_0, 0_1, 1_0, 1_1, or 2_3 (operation 2006). When the uplink channel and signal is not the uplink channel and signal scheduled through DCI, the terminal may not transmit the uplink channel and signal 1108 (operation 2007). When the uplink channel and signal is scheduled through the DCI 1106, the terminal may transmit the uplink channel and signal 1109 (operation 2008). Not all operations described in FIG. 20 should be performed in the described order, and the order in which each operation is performed may be changed or omitted.

Method 3

When a terminal is configured with an XDD indicator (defined in Fourth Embodiment), the terminal may not transmit an uplink control channel, random access channel, and SRS, but may transmit an uplink data channel, in slot(s)/symbol(s) in which time domain uplink-downlink configuration information is configured as downlink.

As described above, in case that uplink channel signal reception is performed in a slot/symbol in which uplink-downlink configuration information is configured as downlink, from the viewpoint of a terminal, a terminal transmitting an uplink channel/signal may have an interference effect due to OOB emission on a terminal receiving a downlink channel/signal in the vicinity. In order to minimize an interference effect, an uplink channel/signal having a high priority may be transmitted in a slot/symbol in which uplink-downlink configuration information is configured as downlink. In this case, from the viewpoint of coverage extension between a base station and a terminal, a channel having a highest priority may be an uplink data channel.

According to an embodiment, because an uplink data channel has smallest coverage from among uplink/downlink channels and signals, overall coverage between a base station and a terminal may be determined by the uplink data channel. Accordingly, terminals configured with an XDD indicator may transmit an uplink data channel having a highest priority, in a time domain slot/symbol in which uplink-downlink configuration information is configured as downlink, thereby extending coverage.

Figure 21:
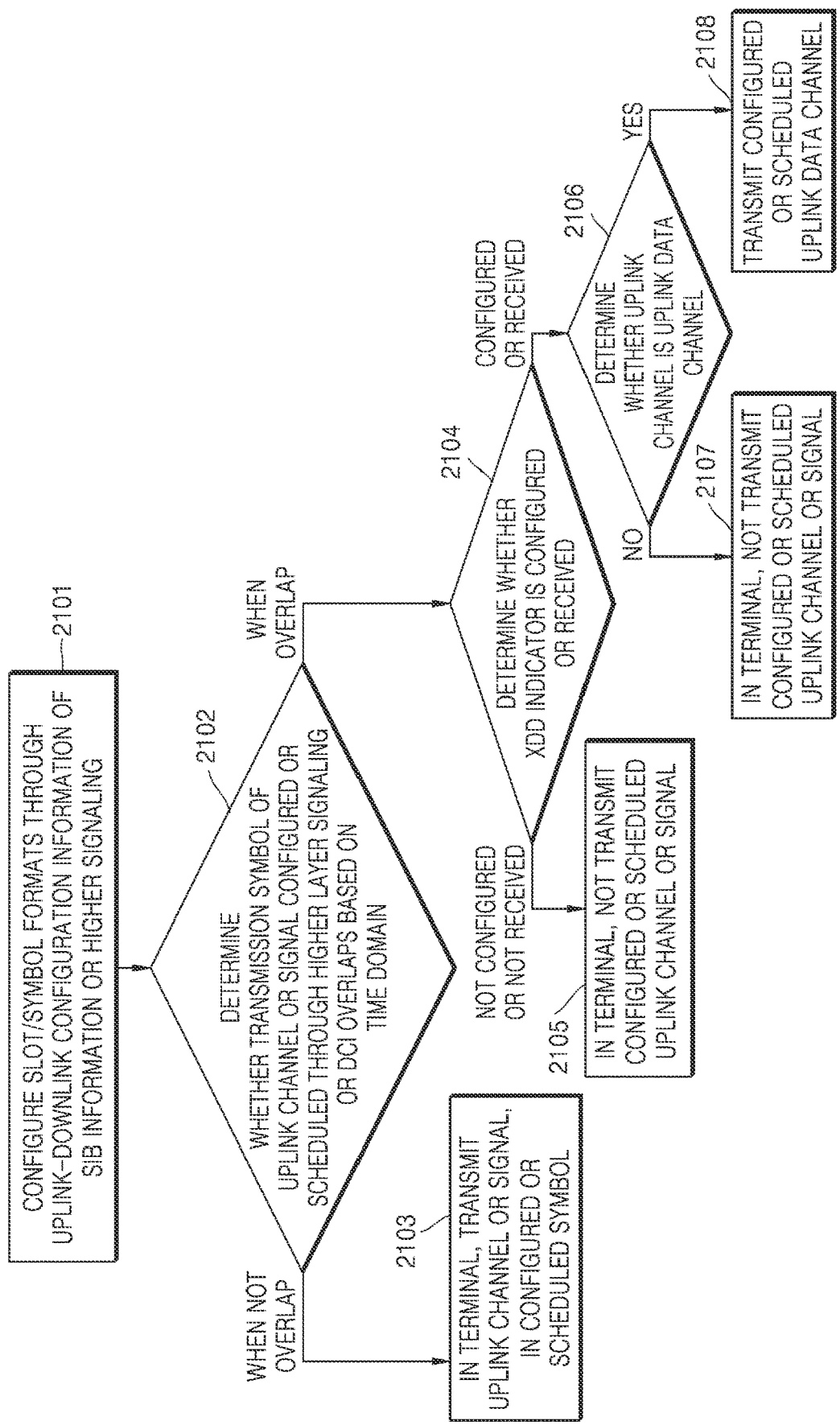
FIG. 21 is a diagram illustrating another method by which a terminal determines whether to transmit an uplink channel and signal, according to an embodiment of the disclosure.

FIG. 21 is a diagram illustrating another method by which a terminal determines whether to transmit an uplink channel and signal, according to an embodiment of the disclosure.

Referring to FIG. 21, a terminal may be aware of slots/symbols in which uplink-downlink configuration information is configured as downlink through received SIB information or higher layer signaling (operation 2101). The terminal may determine whether a transmission symbol of an uplink data, control, random access channel, or SRS 1108/1109 configured or scheduled through higher layer signaling or DCI format 0, 0_1, 1_0, 1_1, or 2_3 overlaps based on a time domain (operation 2102).

In an embodiment, in case that the transmission symbol of the configured or scheduled uplink data, control, random access channel, or SRS 1108/1109 does not overlap based on the time domain, the terminal may transmit the uplink channel or signal 1108/1109, in the configured or scheduled symbol (operation 2103). In an embodiment, in case that the transmission symbol overlaps based on the time domain, the terminal may determine whether an XDD system indicator (or priority rule change indicator, described in Fourth Embodiment) is configured or received (operation 2104).

In an embodiment, when the terminal is not configured with or does not receive an XDD system indicator, the terminal may not transmit the uplink data, control, random access channel, or SRS scheduled through higher layer signaling or DCI format 0_0, 0_1, 1_0, 1_1, or 2_3, in the time domain slot(s)/symbol(s) in which the uplink-downlink configuration information is configured as downlink (operation 2105).

In an embodiment, when the terminal is configured with or receives the XDD system indicator, the terminal may determine whether the uplink channel is the uplink data channel 1109 scheduled through higher layer signaling or DCI (operation 2106). When the uplink channel is not the uplink data channel, the terminal may not transmit the uplink channel, in the slot/symbol in which the uplink-downlink configuration information is configured as downlink (operation 2107). When it is determined that the uplink channel is the uplink data channel, the terminal may transmit the uplink data channel, in the slot/symbol in which the uplink-downlink configuration information is configured as downlink (operation 2108). Not all operations described in FIG. 21 should be performed in the described order, and the order in which each operation is performed may be changed or omitted.

In the above method, a method of determining and transmitting an uplink channel or signal in a time domain slot/symbol in which uplink downlink configuration information is configured as downlink when an XDD indicator (defined in Fourth Embodiment) is configured is not limited to a data channel, and may also be applied to other uplink channels or signals such as a control channel, random access, and SRS.

Method 4

When a terminal is configured with an XDD indicator (defined in Fourth Embodiment), the terminal may transmit an uplink data channel, control channel, random access channel, and SRS when a different additional condition for each channel is satisfied in time domain slot(s)/symbol(s) in which uplink-downlink configuration information is configured as downlink.

As described above, in case that uplink channel signal reception is performed in a slot/symbol in which uplink-downlink configuration information is configured as downlink, from the viewpoint of a terminal, a terminal transmitting an uplink channel/signal may have an interference effect due to OOB emission on a terminal receiving a downlink channel/signal in the vicinity. In order to minimize an interference effect, when a base station performs scheduling along with a coverage-related configuration on a terminal in a situation where coverage of the base station and the terminal is poor, the terminal may transmit an uplink channel or signal, in a time domain slot/symbol in which uplink-downlink configuration information is configured as downlink. The coverage-related configuration may include at least one of the following configurations.

Specific number of repetition times of a data channel or more

Pi/2-BPSK modulation

DFT-s-OFDM transmission method

Specific aggregation level of a downlink control channel for scheduling an uplink channel or signal or more New radio network temporary identifier (RNTI) of DCI for scheduling an uplink channel or signal Frequency hopping Specific uplink control channel format Specific TPC command Specific MCS index or less Specific PRACH configuration index A terminal may determine whether to transmit an uplink channel or signal in a time domain slot/symbol in which uplink-downlink configuration information is configured as downlink, based on a coverage-related configuration. The coverage-related configuration may vary according to each uplink channel or signal. Accordingly, terminals configured with an XDD indicator may transmit an uplink channel or signal even in a slot/symbol in which uplink-downlink configuration information is configured as downlink when a coverage-related configuration is scheduled, thereby extending coverage.

Figure 22:
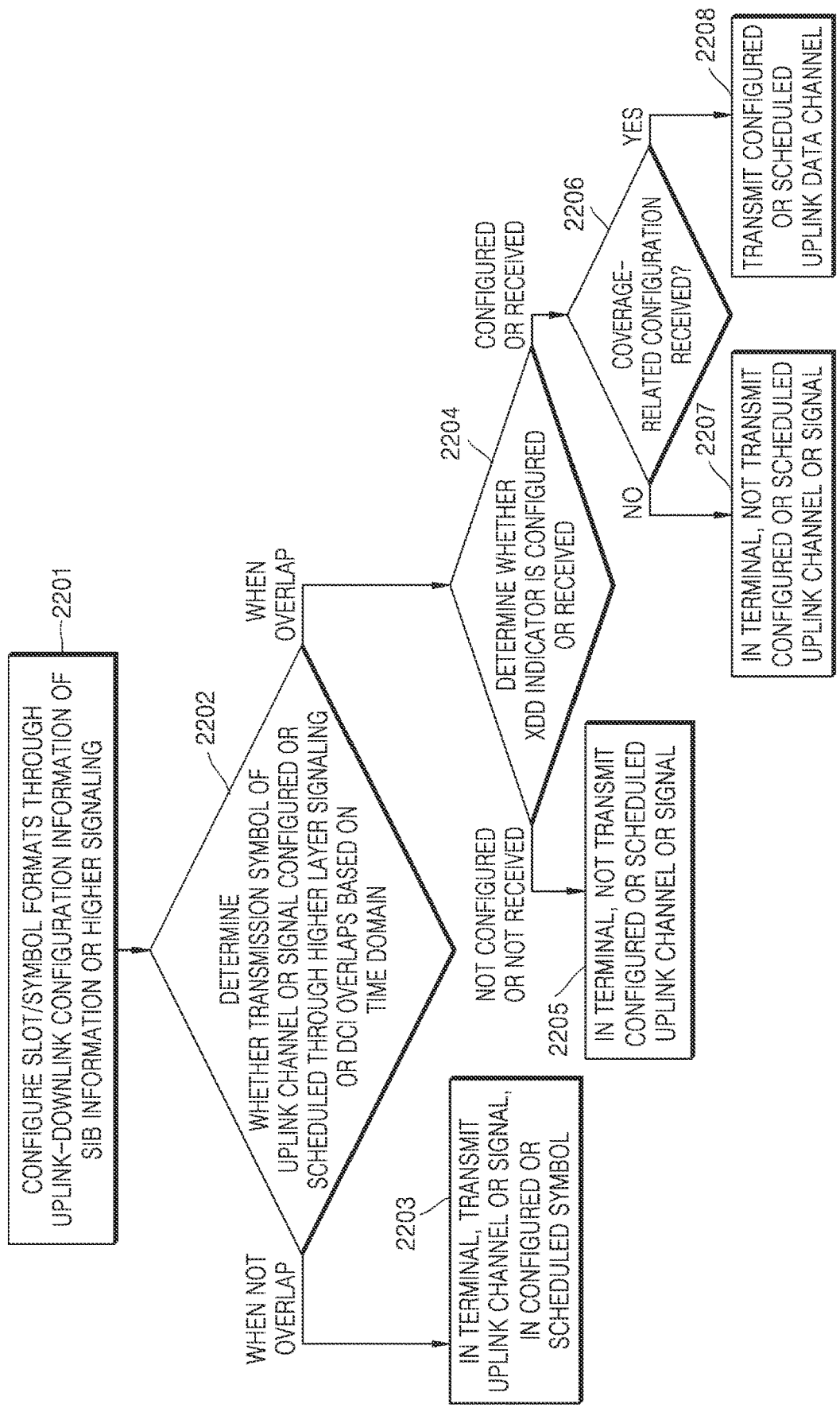
FIG. 22 is a diagram illustrating another method by which a terminal determines whether to transmit an uplink channel and signal, according to an embodiment of the disclosure.

FIG. 22 is a diagram illustrating another method by which a terminal determines whether to transmit an uplink channel and signal, according to an embodiment of the disclosure.

Referring to FIG. 22, a terminal may be aware of slots/symbols in which uplink-downlink configuration information is configured as downlink through received SIB information or higher layer signaling (operation 2201). The terminal may determine whether a transmission symbol of an uplink data, control, random access channel, or SRS 1108/1109 configured or scheduled through higher layer signaling or DCI format 0_0, 0_1, 1_0, 1_1, or 2_3 overlaps based on a time domain (operation 2202).

In an embodiment, in case that the transmission symbol of the configured or scheduled uplink data, control, random access channel, or SRS 1108/1109 does not overlap based on the time domain, the terminal may transmit the uplink channel or signal 1108/1109, in the configured or scheduled symbol (operation 2203). In an embodiment, in case that the transmission symbol overlaps based on the time domain, the terminal may determine whether an XDD system indicator (or priority rule change indicator, described in Fourth Embodiment) is configured or received (operation 2204).

In an embodiment, when the terminal is not configured with or does not receive an XDD system indicator, the terminal may not transmit the uplink data, control, random access channel, or SRS scheduled through higher layer signaling or DCI format 0_0, 0_1, 1_0, 1_1, or 2_3 in the time domain slot(s)/symbol(s) in which the uplink-downlink configuration information is configured as downlink (operation 2205).

In an embodiment, when the terminal is configured with or receives the XDD system indicator, the terminal may determine whether the uplink channel or signal is scheduled along with a coverage-related configuration through higher layer signaling or DCI (operation 2206). In an embodiment, when the terminal does not receive the coverage-related configuration, the terminal may not transmit the uplink channel/signal, in the slot/symbol in which the uplink-downlink configuration information is configured as downlink (operation 2207). In an embodiment, when the terminal receives the coverage-related configuration, the terminal may transmit the scheduled uplink channel/signal, in the slot/symbol in which the uplink-downlink configuration information is configured as downlink (operation 2208). Not all operations described in FIG. 22 should be performed in the described order, and the order in which each operation is performed may be changed or omitted.

Fourth Embodiment

Fourth Embodiment relates to an operation of a terminal after a base station configures an XDD indicator (priority rule indicator) in the terminal, in First Embodiment, Second Embodiment, and Third Embodiment. In detail, as described above, an indicator for configuring, in a terminal, an XDD system in which uplink and downlink resources may be divided not only in a time but also in a frequency may be required as described in First Embodiment, Second Embodiment, and Third Embodiment. In particular, in case that there is no indicator when a terminal supporting TDD and a terminal supporting XDD coexist, operations of the TDD terminal and the XDD terminal are inevitably the same when an uplink transmission configuration and a downlink reception configuration are simultaneously received in the same symbol. In this case, an operation of a terminal performed in the same manner as in a TDD system may be very limited in supporting an XDD system. In particular, an operation of a terminal in one symbol through cell-specific system information may be limited to downlink reception or uplink transmission as in First Embodiment, Second Embodiment, and Third Embodiment. Accordingly, when a base station configures an XDD indicator in a terminal, the terminal configured with the XDD indicator may perform an operation different from that of a TDD terminal.

Accordingly, the following methods may be considered as a method by which a base station configures an XDD indicator in a terminal.

Method 1

A base station may explicitly or implicitly configure an XDD indicator in a terminal through system information including cell-specific configuration information, terminal dedicated higher layer signaling, MAC CE, or DCI. In this case, the terminal configured with the XDD indicator may perform at least one of the above embodiments. For example, the terminal configured with the XDD indicator may perform First Embodiment, but may not perform Second Embodiment and Third Embodiment. That is, in case that a time domain position where a synchronization signal block is transmitted is configured in an XDD system, a method by which a terminal transmits an uplink channel or signal may be applied. Also, in case that a valid PRACH occasion is configured, a terminal may not receive a downlink channel/signal as in the TDD system. In the above method, an operation when a terminal is configured with an XDD indicator is not limited to First Embodiment, Second Embodiment, and Third Embodiment, and an operation different from an operation of a TDD terminal when an uplink transmission configuration and a downlink reception configuration are simultaneously received in the same symbol may be applied.

Method 2

A base station may explicitly or implicitly configure an XDD indicator in a terminal through system information including cell-specific configuration information, terminal dedicated higher layer signaling, MAC CE, or DCI. In this case, the terminal may perform an operation of a different embodiment according to a position where the XDD indicator is configured. For example, when the terminal is configured with the indicator in the system information including the cell-specific configuration information, the terminal may perform a terminal operation of First Embodiment and Second Embodiment related to the cell-specific configuration information. Alternatively, when the terminal is configured through the terminal dedicated higher layer signaling, the terminal may perform a terminal operation of Third Embodiment related to the terminal dedicated configuration information. In the above method, an operation when a terminal is configured with an XDD indicator is not limited to First Embodiment, Second Embodiment, and Third Embodiment, and an operation different from an operation of a TDD terminal when an uplink transmission configuration and a downlink reception configuration are simultaneously received in the same symbol may be applied.

Method 3

A base station may explicitly or implicitly configure an XDD indicator in a terminal through system information including cell-specific configuration information, terminal dedicated higher layer signaling, MAC CE, or DCI. In this case, the XDD indicator may indicate at least one of pre-defined operations of the terminal. The pre-defined operations of the terminal may include at least one of following operations.

First Embodiment: method by which a terminal transmits an uplink channel or signal in case that a time domain position where a synchronization signal block is transmitted is configured Second Embodiment: method by which a terminal receives a downlink channel or signal in case that a valid PRACH occasion is configured Third Embodiment: method by which a terminal receives a downlink channel/signal or a method by which a terminal transmits an uplink channel/signal in case that a slot/symbol format is configured as uplink or downlink For example, an XDD indicator configured through system information including cell-specific configuration information, terminal dedicated higher layer signaling, MAC CE, or DCI may indicate specific terminals to perform methods included in First Embodiment and Third Embodiment, and may indicate other specific terminals to perform methods included in First Embodiment and Second Embodiment. In the above method, an operation when a terminal is configured with an XDD indicator is not limited to First Embodiment, Second Embodiment, and Third Embodiment, and an operation different form an operation of a TDD terminal when an uplink transmission configuration and a downlink reception configuration are simultaneously received in the same symbol may be applied.

Figure 23:
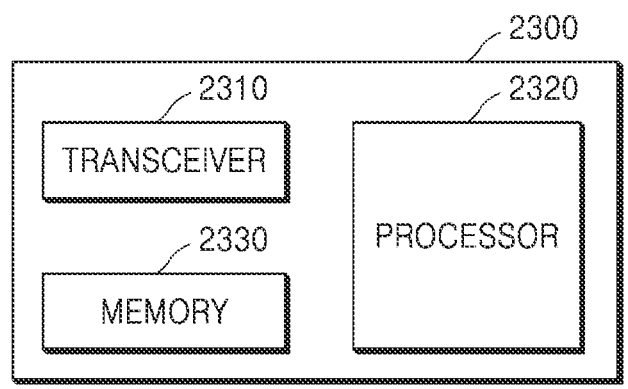
FIG. 23 is a block diagram illustrating a terminal, according to an embodiment of the disclosure.

FIG. 23 is a block diagram illustrating a terminal, according to an embodiment of the disclosure.

Referring to FIG. 23, a terminal 2300 may include a transceiver 2310, a processor 2320, and a memory 2330. According to an efficient channel and signal transmitting and receiving method in a 5G communication system corresponding to the above embodiment, the transceiver 2310, the processor 2320, and the memory 2330 of the terminal 2300 may operate. However, elements of the terminal 2300 according to an embodiment are not limited to those illustrated in FIG. 23. According to another embodiment, the terminal 2300 may include more or fewer elements than those illustrated in FIG. 23. Also, in a specific case, the transceiver 2310, the processor 2320, and the memory 2330 may be implemented as one chip.

The transceiver 2310 may include a transmitter and a receiver, according to another embodiment. The transceiver 2310 may transmit and receive a signal to and from a base station. The signal may include control information and data. The transceiver 2310 may include a radio frequency (RF) transmitter for up-converting and amplifying a frequency of a transmitted signal, and a RF receiver for low-noise amplifying and down-converting a frequency of a received signal. Also, the transceiver 2310 may receive a signal through a radio channel and output the received signal to the processor 2320, and transmit a signal output from the processor 2320 through the radio channel.

The processor 2320 may control a series of processes performed by the terminal 2300 according to an embodiment of the disclosure. For example, the processor 2320 may control elements of the terminal 2300 to perform a method of transmitting and receiving a channel and signal according to an embodiment of the disclosure. A plurality of processors 2320 may be provided. The processor 2320 may perform a channel and signal transmitting and receiving operation of the disclosure by executing a program stored in the memory 2330. For example, the processor 2320 may differently control a channel and signal transmitting and receiving method according to an embodiment of the disclosure, that is, a method by which a terminal transmits an uplink channel or signal in case that a time domain position where a synchronization signal block is transmitted is configured in an XDD system, a method by which a terminal receives a downlink channel or signal in case that a PRACH occasion is configured, a method of transmitting an uplink channel or signal in a slot/symbol in which uplink-downlink configuration information is configured as downlink, or a method by which a base station configures an XDD indicator in a terminal.

The memory 2330 may store a program and data required to operate the terminal 2300. Also, the memory 2330 may store control information or data included in a signal transmitted and received by the terminal. The memory 1020 may include a storage medium such as read only memory (ROM), random access memory (RAM), hard-disk, compact disc (CD)-ROM, or digital versatile disc (DVD), or a combination thereof. Also, a plurality of memories 1020 may be provided. In an embodiment, the memory 2330 may store control information or data such as a resource configuration in which a synchronization signal block is transmitted, a valid random access channel transmission resource configuration, or uplink-downlink configuration information which is included in a signal obtained by the terminal 2300, and may have an area for storing data required for control by the processor 2320 and data generated during control by the processor 2320.

Figure 24:
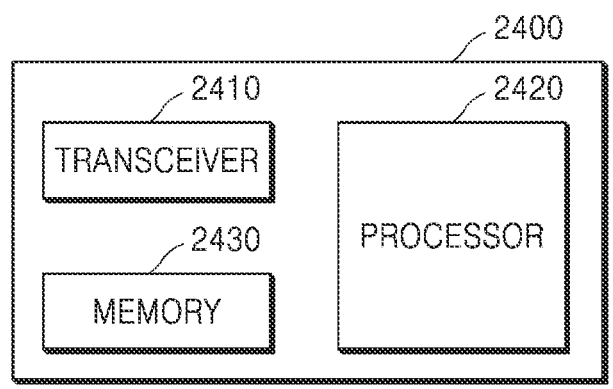
FIG. 24 is a block diagram illustrating a base station, according to an embodiment of the disclosure.

FIG. 24 is a block diagram illustrating a base station, according to an embodiment of the disclosure.

Referring to FIG. 24, a base station 2400 may include a transceiver 2410, a processor 2420, and a memory 2430. According to an efficient channel and signal transmitting and receiving method in a 5G communication system corresponding to the above embodiment, the transceiver 2410, the processor 2420, and the memory 2430 of the base station 2400 may operate. However, elements of the base station 2400 according to an embodiment are not limited to those illustrated in FIG. 24. According to another embodiment, the base station 2400 may include more or fewer elements than those illustrated in FIG. 24. Also, in a specific case, the transceiver 2410, the processor 2420, and the memory 2430 may be implemented as one chip.

The transceiver 2410 may include a transmitter and a receiver, according to another embodiment. The transceiver 2410 may transmit and receive a signal to and from a terminal. The signal may include control information and data. The transceiver 2410 may include a RF transmitter for up-converting and amplifying a frequency of a transmitted signal, and a RF receiver for low-noise amplifying and down-converting a frequency of a received signal. Also, the transceiver 2410 may receive a signal through a radio channel and output the received signal to the processor 2420, and transmit a signal output from the processor 2420 through the radio channel.

The processor 2420 may control a series of processes performed by the base station 2400 according to an embodiment of the disclosure. For example, the processor 2420 may control elements of the base station 2400 to perform a method of transmitting and receiving a channel and signal according to an embodiment of the disclosure. A plurality of processors 2420 may be provided. The processor 2420 may perform a channel and signal transmitting and receiving operation of the disclosure by executing a program stored in the memory 2430. For example, the processor 2420 may differently control a channel and signal transmitting and receiving method according to an embodiment of the disclosure, that is, a method by which a base station receives an uplink channel or signal in case that a time domain position where a synchronization signal block is transmitted is configured in an XDD system, a method by which a base station transmits a downlink channel or signal in case that a valid PRACH occasion is configured, a method by which a base station receives an uplink channel or signal in a slot/symbol in which uplink-downlink configuration information is configured as downlink, or a method by which a base station configures an XDD indicator in a terminal.

The memory 2430 may store control information or data such as a resource configuration in which a synchronization signal block is transmitted, a valid random access channel transmission resource configuration, or uplink-downlink configuration information which is determined by the base station 2400 or control information or data received from a terminal, and may have an area for storing data required for control by the processor 2420 and data generated during control by the processor 2420.

According to an embodiment of the disclosure, an operating method of a terminal in a wireless communication system includes receiving, from a base station, information related to a position of a symbol in which a synchronization signal block is transmitted in a time domain, determining whether a position of a symbol configured to transmit an uplink signal overlaps the position of the symbol in which the synchronization signal block is transmitted in the time domain, in case that the position of the symbol configured to transmit the uplink signal overlaps the position of the symbol in which the synchronization signal block is transmitted in the time domain, determining whether a time or frequency-division duplexing (XDD)-related indicator is configured or received, and transmitting the uplink signal to the base station, based on a result of the determining whether the XDD-related indicator is configured or received.

In case that the position of the symbol configured to transmit the uplink signal does not overlap the position of the symbol in which the synchronization signal block is transmitted in the time domain, the uplink signal may be transmitted to the base station at the position of the symbol configured to transmit the uplink signal.

In an embodiment, the transmitting of the uplink signal to the base station based on the result of the determining whether the XDD-related indicator is configured or received may include, in case that it is determined that the XDD-related indicator is configured or received, transmitting the uplink signal at the position of the symbol configured to transmit the uplink signal.

In case that the XDD-related indicator is not configured or not received, the uplink signal may not be transmitted to the base station at the position of the symbol configured to transmit the uplink signal.

According to an embodiment, the transmitting of the uplink signal to the base station based on the result of the determining whether the XDD-related indicator is configured or received may include in case that it is determined that the XDD-related indicator is configured or received, determining whether the uplink signal is scheduled through downlink control information, and in case that it is determined that the uplink signal is scheduled through the downlink control information, transmitting the scheduled uplink signal to the base station at the position of the symbol configured to transmit the uplink signal.

In case that the uplink signal is not scheduled through the downlink control information, the uplink signal may not be transmitted at the position of the symbol configured to transmit the uplink signal.

According to an embodiment, the transmitting of the uplink signal to the base station based on the result of the determining whether the XDD-related indicator is configured or received may include in case that it is determined that the XDD-related indicator is configured or received, determining whether the uplink signal corresponds to an uplink data channel, and in case that it is determined that the uplink signal corresponds to the uplink data channel, transmitting the uplink signal corresponding to the uplink data channel to the base station at the position of the symbol configured to transmit the uplink signal.

In case that the uplink signal does not correspond to the uplink data channel, the uplink signal may not be transmitted at the position of the symbol configured to transmit the uplink signal.

According to an embodiment, the transmitting of the uplink signal to the base station based on the result of the determining whether the XDD-related indicator is configured or received may include, in case that it is determined that the XDD-related indicator is configured or received, determining whether the uplink signal is scheduled based on a coverage-related configuration, and in case that it is determined that the uplink signal is scheduled based on the coverage-related configuration, transmitting the scheduled uplink signal to the base station.

In case that the uplink signal is not scheduled based on the coverage-related configuration, the uplink signal may not be transmitted.

According to an embodiment, the XDD-related indicator may be configured through at least one of system information, terminal dedicated higher layer signaling, medium access control control element (MAC CE), or downlink control information.

According to an embodiment of the disclosure, an operating method of a terminal in a wireless communication system includes receiving, from a base station, information related to a position of a symbol in which a random access channel occasion is configured in a time domain, determining whether a position of a symbol configured to receive a downlink signal overlaps the position of the symbol in which the random access channel occasion is configured in the time domain, in case that the position of the symbol configured to receive the downlink signal overlaps the position of the symbol in which the random access channel occasion is configured in the time domain, determining whether a time or frequency-division duplexing (XDD)-related indicator is configured or received, and receiving the downlink signal from the base station, based on a result of the determining whether the XDD-related indicator is configured or received.

In case that the position of the symbol configured to receive the downlink signal does not overlap the position of the symbol in which the random access channel occasion is configured in the time domain, the downlink signal may be received from the base station at the position of the symbol configured to receive the downlink signal.

According to an embodiment, the receiving of the downlink signal from the base station based on the result of the determining whether the XDD-related indicator is configured or received may include, in case that it is determined that the XDD-related indicator is configured or received, receiving the downlink signal from the base station at the position of the symbol configured to receive the downlink signal.

In case that the XDD-related indicator is not configured or is not received, the downlink signal may not be transmitted from the base station at the position of the symbol configured to receive the downlink signal.

According to an embodiment, the receiving of the downlink signal from the base station based on the result of the determining whether the XDD-related indicator is configured or received may include, in case that it is determined that the XDD-related indicator is configured or received, determining whether the downlink signal is scheduled through downlink control information, and in case that it is determined that the downlink signal is scheduled through the downlink control information, receiving the scheduled downlink signal from the base station at the position of the symbol configured to receive the downlink signal.

In case that the downlink signal is not scheduled through the downlink control information, the downlink signal may not be received at the position of the symbol configured to receive the downlink signal.

According to an embodiment, the receiving of the downlink signal from the base station based on the result of the determining whether the XDD-related indicator is configured or received may include, in case that it is determined that the XDD-related indicator is configured or received, determining whether the downlink signal corresponds to a synchronization signal block, and in case that it is determined that the downlink signal corresponds to the synchronization signal block, receiving the downlink signal corresponding to the synchronization signal block from the base station at the position of the symbol configured to receive the downlink signal.

In case that the downlink signal does not correspond to the synchronization signal block, the downlink signal may not be received at the position of the symbol configured to receive the downlink signal.

According to an embodiment of the disclosure, an operating method of a terminal in a wireless communication system includes identifying a position of a symbol configured as downlink through uplink-downlink configuration information, based on system information or higher layer signaling, determining whether a position of a symbol configured to transmit an uplink signal overlaps the position of the symbol configured as the downlink in a time domain, in case that the position of the symbol configured to transmit the uplink signal overlaps the position of the symbol configured as the downlink in the time domain, determining whether a time or frequency-division duplexing (XDD)-related indicator is configured or received, and transmitting the uplink signal to a base station, based on a result of the determining whether the XDD-related indicator is configured or received.

In case that the position of the symbol configured to transmit the uplink signal does not overlap the position of the symbol configured as the downlink in the time domain, the uplink signal may be transmitted to the base station at the position of the symbol configured to transmit the uplink signal.

According to an embodiment, the transmitting of the uplink signal to the base station based on the result of the determining whether the XDD-related indicator is configured or received may include, in case that it is determined that the XDD-related indicator is configured or received, transmitting the uplink signal to the base station at the position of the symbol configured to transmit the uplink signal.

In case that the XDD-related indicator is not configured or is not received, the uplink signal may not be transmitted to the base station at the position of the symbol configured to transmit the uplink signal.

According to an embodiment, the transmitting of the uplink signal to the base station based on the result of the determining whether the XDD-related indicator is configured or received may include, in case that it is determined that the XDD-related indicator is configured or received, determining whether the uplink signal is scheduled through downlink control information, and in case that it is determined that the uplink signal is scheduled through the downlink control information, transmitting the scheduled uplink signal to the base station at the position of the symbol configured to transmit the uplink signal.

In case that the uplink signal is not scheduled through the downlink control information, the uplink signal may not be transmitted at the position of the symbol configured to transmit the uplink signal.

According to an embodiment, the transmitting of the uplink signal to the base station based on the result of the determining whether the XDD-related indicator is configured or received may include, in case that it is determined that the XDD-related indicator is configured or received, determining whether the uplink signal corresponds to an uplink data channel, and in case that it is determined that the uplink signal corresponds to the uplink data channel, transmitting the uplink signal corresponding to the uplink data channel to the base station at the position of the symbol configured to transmit the uplink signal.

In case that the uplink signal does not correspond to the uplink data channel, the uplink signal may not be transmitted at the position of the symbol configured to transmit the uplink signal.

According to an embodiment, the transmitting of the uplink signal to the base station based on the result of the determining whether the XDD-related indicator is configured or received may include, in case that it is determined that the XDD-related indicator is configured or received, determining whether the uplink signal is scheduled based on a coverage-related configuration, and in case that it is determined that the uplink signal is scheduled based on the coverage-related configuration, transmitting the scheduled uplink signal to the base station.

In case that the uplink signal is not scheduled based on the coverage-related configuration, the uplink signal may not be transmitted.

It should be understood that the embodiments of the disclosure described herein should be considered in a descriptive sense only and not for purposes of limitation. That is, it will be understood by one of ordinary skill in the art that various changes in form and details may be made in the embodiments of the disclosure without departing from the spirit and scope of the disclosure. Also, the embodiments may be combined with each other as required.

Methods according to the embodiments of the disclosure as described in the detailed description or in the following claims may be implemented as hardware, software, or a combination of hardware and software.

When the methods are implemented as software, a computer-readable storage medium or a computer program product storing one or more programs (software modules) may be provided. The one or more programs that are stored in the computer-readable storage medium or the computer program product are configured to be executable by one or more processors in an electronic device. The one or more programs include instructions for allowing the electronic device to execute the methods according to the claims or the embodiments of the disclosure.

The programs (e.g., software modules or software) may be stored in a non-volatile memory including a random access memory (RAM) or a flash memory, a read-only memory (ROM), an electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in a memory including any combination of some or all of the above storage media. Also, a plurality of such constituent memories may be provided.

Also, the programs may be stored in an attachable storage device that is accessible through a communication network, such as the Internet, an intranet, a local area network (LAN), a wide LAN (WLAN), or a storage area network (SAN), or a combination thereof. Such a storage device may access, via an external port, the electronic device for performing embodiments of the disclosure. Furthermore, an additional storage device on the communication network may access the electronic device for performing embodiments of the disclosure.

In the disclosure, the term "computer program product" or "computer-readable recording medium" is used to totally indicate a memory, a hard disc mounted in a hard disk drive, and a medium such as a signal. The "computer program product" or the "computer-readable recording medium" is a means to be provided to a method of transmitting and receiving a channel and signal according to the disclosure.

In the afore-described embodiments of the disclosure, elements included in the disclosure are expressed in a singular or plural form according to the embodiments of the disclosure. However, the singular or plural form is selected appropriately for a condition provided for convenience of explanation, and the disclosure is not limited to the singular or plural form. An element expressed in a singular form may include a plurality of elements and elements expressed in a plural form may include a single element.

Particular embodiments of the disclosure have been described in the detailed descriptions of the disclosure, but it will be understood that various modifications may be made without departing the scope of the disclosure. Hence, the scope of the disclosure is not limited to the above embodiments of the disclosure, and may be defined by not only the following claims but also equivalents thereof.

The invention claimed is:

1. An operating method of a terminal in a wireless communication system, the operating method comprising:
   receiving, from a base station, information related to at least one symbol in which a synchronization signal block (SSB) is transmitted;
   receiving, from the base station, information related to at least one symbol for uplink signal;
   identifying whether the at least one symbol for uplink signal overlaps the at least one symbol in which the SSB is transmitted in a time domain;
   in case that the at least one symbol for uplink signal overlaps the at least one symbol in which the SSB is transmitted in the time domain,
      based on an indicator associated with time or frequency division duplexing (XDD) being received from the base station, transmitting the uplink signal to the base station, on the at least one symbol overlapped in the time domain and on a frequency different from a frequency of the at least one symbol in which the SSB is transmitted in a bandwidth, and
      based on the indicator associated with XDD not being received, the uplink signal is not transmitted to the base station on the at least one symbol overlapped in the time domain; and
   in case that the at least one symbol for the uplink signal does not overlap the at least one symbol in which the SSB is transmitted in the time domain, transmitting the uplink signal to the base station, on the at least one symbol for the uplink signal.

2. The operating method of claim 1, further comprising:
   based on the indicator associated with XDD being received from the base station, identifying whether the uplink signal is scheduled through downlink control information (DCI); and
   in case that the uplink signal is scheduled through the DCI, transmitting the scheduled uplink signal, to the base station, on the at least one symbol overlapped in the time domain and on the frequency different from the frequency of the at least one symbol in which the SSB is transmitted in the bandwidth, and
   in case that the uplink signal is not scheduled through the DCI, the uplink signal is not transmitted on the at least one symbol overlapped in the time domain.

3. The operating method of claim 1, further comprising:
   based on the indicator associated with XDD being received from the base station, identifying whether the uplink signal corresponds to an uplink data channel; and
   in case that the uplink signal corresponds to the uplink data channel, transmitting the uplink signal corresponding to the uplink data channel, to the base station, on the at least one symbol overlapped in the time domain and on the frequency different from the frequency of the at least one symbol in which the SSB is transmitted in the bandwidth, and
   in case that the uplink signal does not correspond to the uplink data channel, the uplink signal is not transmitted on the at least one symbol overlapped in the time domain.

4. The operating method of claim 1, further comprising:
   based on the indicator associated with XDD being received from the base station, identifying whether the uplink signal is scheduled with a coverage-related configuration; and
   in case that the uplink signal is scheduled with the coverage-related configuration, transmitting the scheduled uplink signal to the base station, on the at least one symbol overlapped in the time domain and on the frequency different from the frequency of the at least one symbol in which the SSB is transmitted in the bandwidth, and
   in case that the uplink signal is not scheduled with the coverage-related configuration, the uplink signal is not transmitted on the at least one symbol overlapped in the time domain.

5. The operating method of claim 1, wherein the indicator associated with XDD is received through at least one of: system information, terminal dedicated higher layer signaling, medium access control control element (MAC CE), or downlink control information (DCI).

6. An operating method of a terminal in a wireless communication system, the operating method comprising:
   receiving, from a base station, information related to at least one symbol in which a random access channel (RACH) occasion is configured;
   receiving, from the base station, information related to at least one symbol for downlink signal;
   identifying whether the at least one symbol for downlink signal overlaps the at least one symbol in which the RACH occasion is configured, in a time domain;
   in case that the at least one symbol for downlink signal overlaps the at least one symbol in which the RACH occasion is configured, in the time domain,
      based on an indicator associated with time or frequency division duplexing (XDD) being received from the base station, receiving the downlink signal, from the base station, on the at least one symbol overlapped in the time domain and on a frequency different from a frequency of the at least one symbol in which the RACH occasion is configured in a bandwidth, and
      based on the indicator associated with XDD not being received, the downlink signal is not received from the base station, on the at least one symbol overlapped in the time domain; and
   in case that the at least one symbol for downlink signal does not overlap the at least one symbol in which the RACH occasion is configured in the time domain, the downlink signal is received, from the base station, at the at least one symbol for downlink signal.

7. The operating method of claim 6, further comprising:
   based on the indicator associated with XDD being received from the base station, identifying whether the downlink signal is scheduled through downlink control information (DCI); and
   in case that the downlink signal is scheduled through the DCI, receiving the scheduled downlink signal from the base station on the at least one symbol overlapped in the time domain and on the frequency different from the frequency of the at least one symbol in which the RACH occasion is configured in the bandwidth, and
   in case that the downlink signal is not scheduled through the DCI, the downlink signal is not received on the at least one symbol overlapped in the time domain.

8. The operating method of claim 6, further comprising:
based on the indicator associated with XDD being received from the base station, identifying whether the downlink signal corresponds to a synchronization signal block (SSB); and
in case that the downlink signal corresponds to the SSB, receiving the downlink signal corresponding to the SSB, from the base station, on the at least one symbol overlapped in the time domain and on the frequency different from the frequency of the at least one symbol in which the RACH occasion is configured in the bandwidth, and
in case that the downlink signal does not correspond to the SSB, the downlink signal is not received at the at least one symbol overlapped in the time domain.

9. An operating method of a terminal in a wireless communication system, the operating method comprising:
identifying at least one symbol configured as downlink through uplink-downlink configuration information, based on system information or higher layer signaling;
identifying whether at least one symbol for uplink signal overlaps the at least one symbol configured as the downlink through uplink-downlink configuration information, in a time domain;
in case that the at least one symbol for uplink signal overlaps the at least one symbol configured as the downlink through uplink-downlink configuration information, in the time domain,
 based on an indicator associated with time or frequency division duplexing (XDD) being received from a base station, transmitting the uplink signal to the base station, on the at least one symbol overlapped in the time domain and on a frequency different from a frequency of the at least one symbol configured as the downlink in a bandwidth, and
 based on the indicator associated with XDD not being received, the uplink signal is not transmitted to the base station on the at least one symbol overlapped in the time domain; and
in case that the at least one symbol for uplink signal does not overlap the at least one symbol configured as the downlink through uplink-downlink configuration information, in the time domain, transmitting the uplink signal to the base station at the at least one symbol for uplink signal.

10. The operating method of claim 9, further comprising:
based on the indicator associated with XDD being received from the base station, identifying whether the uplink signal is scheduled through downlink control information (DCI); and
in case that the uplink signal is scheduled through the DCI, transmitting the scheduled uplink signal, to the base station, on the at least one symbol overlapped in the time domain and on the frequency different from the frequency of the at least one symbol configured as the downlink in the bandwidth, and
in case that the uplink signal is not scheduled through the DCI, the uplink signal is not transmitted on the at least one symbol overlapped in the time domain.

11. The operating method of claim 9, further comprising:
based on the indicator associated with XDD being received from the base station, identifying whether the uplink signal corresponds to an uplink data channel; and
in case that the uplink signal corresponds to the uplink data channel, transmitting the uplink signal corresponding to the uplink data channel, to the base station, on the at least one symbol overlapped in the time domain, and on the frequency different from the frequency of the at least one symbol configured as the downlink, in the bandwidth, and
in case that the uplink signal does not correspond to the uplink data channel, the uplink signal is not transmitted on the at least one symbol overlapped in the time domain.

12. The operating method of claim 9, further comprising:
based on the indicator associated with XDD being received from the base station, identifying whether the uplink signal is scheduled with a coverage-related configuration; and
in case that the uplink signal is scheduled with the coverage-related configuration, transmitting the scheduled uplink signal to the base station, on the at least one symbol overlapped in the time domain and on the frequency different from the frequency of the at least one symbol in which a synchronization signal block (SSB) is transmitted in the bandwidth, and
in case that the uplink signal is not scheduled with the coverage-related configuration, the uplink signal is not transmitted on the at least one symbol overlapped in the time domain.

* * * * *